(12) United States Patent
Yang

(10) Patent No.: US 11,982,990 B2
(45) Date of Patent: May 14, 2024

(54) SYSTEM AND METHODS FOR MANUFACTURING A CUSTOM LIGHTING PRODUCT

(71) Applicant: Gantri, Inc, San Francisco, CA (US)

(72) Inventor: Yi Yang, San Francisco, CA (US)

(73) Assignee: Gantri, Inc., San Leandro, CA (US)

( * ) Notice: Subject to any disclaimer, the term of this patent is extended or adjusted under 35 U.S.C. 154(b) by 166 days.

(21) Appl. No.: 17/211,187

(22) Filed: Mar. 24, 2021

(65) Prior Publication Data

US 2022/0308552 A1 Sep. 29, 2022

(51) Int. Cl.
| | |
|---|---|
| *G05B 19/4099* | (2006.01) |
| *B33Y 50/00* | (2015.01) |
| *B33Y 80/00* | (2015.01) |
| *G06F 30/10* | (2020.01) |
| *G06F 113/10* | (2020.01) |

(52) U.S. Cl.
CPC .......... *G05B 19/4099* (2013.01); *B33Y 50/00* (2014.12); *B33Y 80/00* (2014.12); *G06F 30/10* (2020.01); *G05B 2219/49007* (2013.01); *G06F 2113/10* (2020.01)

(58) Field of Classification Search
CPC ...... G05B 19/4099; G05B 2219/49007; B33Y 50/00; B33Y 80/00; G06F 30/10; G06F 2113/10
See application file for complete search history.

(56) References Cited

U.S. PATENT DOCUMENTS

| | | | |
|---|---|---|---|
| 8,155,943 | B2 | 4/2012 | Nasle |
| 2009/0327335 | A1 | 12/2009 | Wahab et al. |
| 2015/0286724 | A1 * | 10/2015 | Knaapen ................. G09G 3/32 703/1 |
| 2017/0038015 | A1 * | 2/2017 | Lunz ..................... F21V 7/0025 |
| 2017/0248937 | A1 * | 8/2017 | Guimbretiere ..... G05B 19/4099 |
| 2020/0156323 | A1 | 5/2020 | Woytowitz et al. |
| 2020/0184125 | A1 * | 6/2020 | Machalica ............. G06F 30/12 |
| 2020/0340647 | A1 * | 10/2020 | Gielen ................ G02B 6/0088 |
| 2021/0241472 | A1 * | 8/2021 | Yokoyama ............ G06T 7/0006 |

FOREIGN PATENT DOCUMENTS

| | | |
|---|---|---|
| WO | WO 2017/080951 | 5/2017 |
| WO | WO 2018/188988 | 10/2018 |
| WO | WO 2021/025939 | 2/2021 |

* cited by examiner

Primary Examiner — Robert E Fennema
Assistant Examiner — Yvonne Trang Follansbee
(74) Attorney, Agent, or Firm — Levine Bagade Han LLP

(57) ABSTRACT

Disclosed are methods and systems for manufacturing a lighting product. The method can comprise transmitting 3D CAD model files containing 3D CAD models of standardized functional components to a computing device and receiving an assembly CAD model file and a plurality of part CAD model files containing 3D CAD models of the lighting product from the computing device. The method can also comprise verifying whether the 3D CAD models satisfy a plurality of design requirements and generating a set of optimized CAD model files based on the assembly CAD model file and the plurality of part CAD model files if the 3D CAD models do not meet the design requirements. The method can further comprise 3D printing parts of the lighting product based on machine-readable instructions converted from the set of optimized CAD model files and assembling the 3D-printed parts together with the standardized functional components.

17 Claims, 17 Drawing Sheets

OTHER EXAMPLES OF TABLE LIGHTS 306
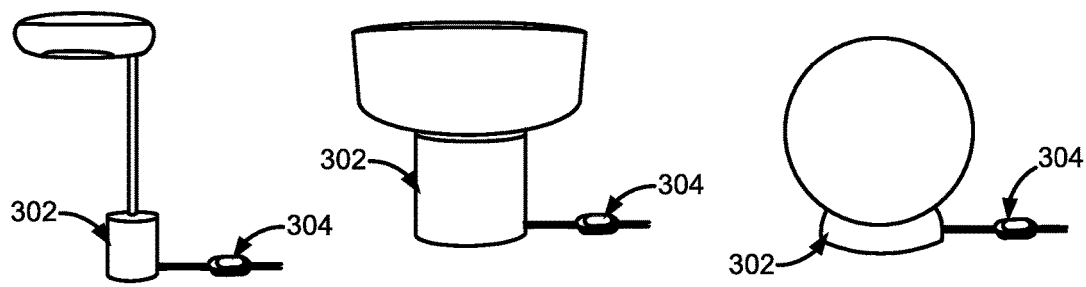
OTHER EXAMPLES OF WALL LIGHTS 314
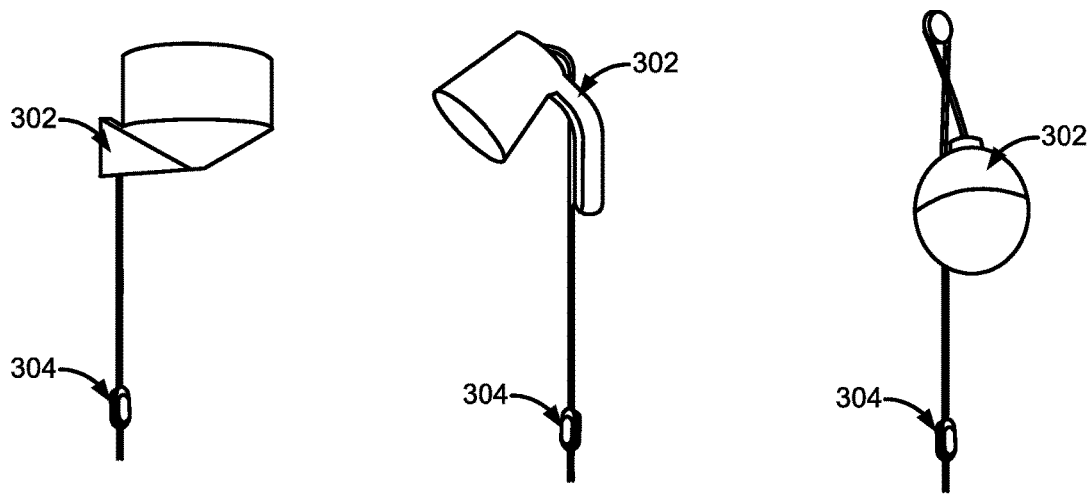
OTHER EXAMPLES OF FLOOR LIGHTS 322
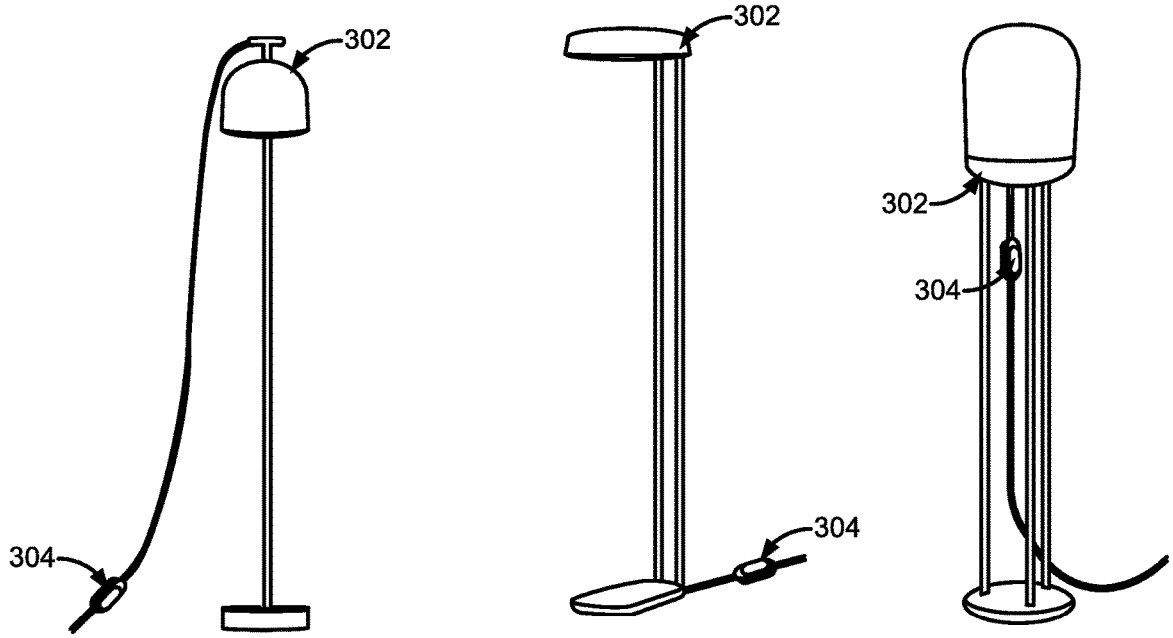
FIG. 3D

FIG. 7

| Name | Description | Type | Created | Link |
|---|---|---|---|---|
| Aluminum Rods | Aluminum rods, Diameter: 5/8" (0.625") Lengths: 12", 18", 24" | Component | 03/15/2021 | → |
| Bulb Kit E12 | This kit is good for wall or floor lights, it has all the necessary components for the product to function: an LED bulb, bulb socket, socket holder and socket cavity (merge with your model). | Component | 03/15/2021 | → |
| Bulb Kit E26 | This kit is good for floor lights, it has all the necessary components for the product to function: an LED bulb, bulb socket, socket holder and socket cavity (merge with your model). | Component | 03/15/2021 | → |
| Flange | Used to attach the aluminum rods to the base with a threaded connector | Component | 03/15/2021 | → |
| Flange small | Used to attach the aluminum rods to the top with a threaded connector | Component | 03/15/2021 | → |
| Floor light 2lb weight with horizontal cavity | You will need a total of four metal weights (8lb) to have enough stability, depending on your design and size you can use the weights in a circular or linear pattern or stacked up in groups of 4 or 2. Download this feature and merge it with your model. | Component | 03/15/2021 | → |
| Floor light 2lb Weight with vertical cavity | You will need a total of four metal weights (8lb) to have enough stability, depending on your design and size you can use the weights in a circular pattern or side by side in a linear pattern. Download this feature and merge it with your model. | Component | 03/15/2021 | → |

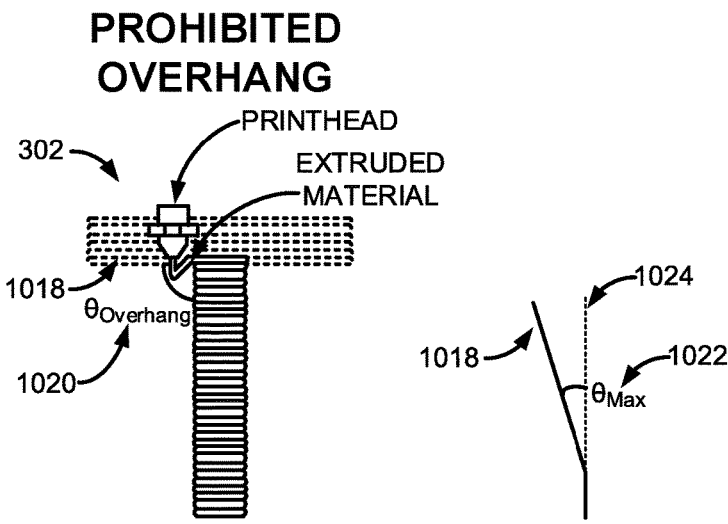
FIG. 10B PROHIBITED OVERHANG
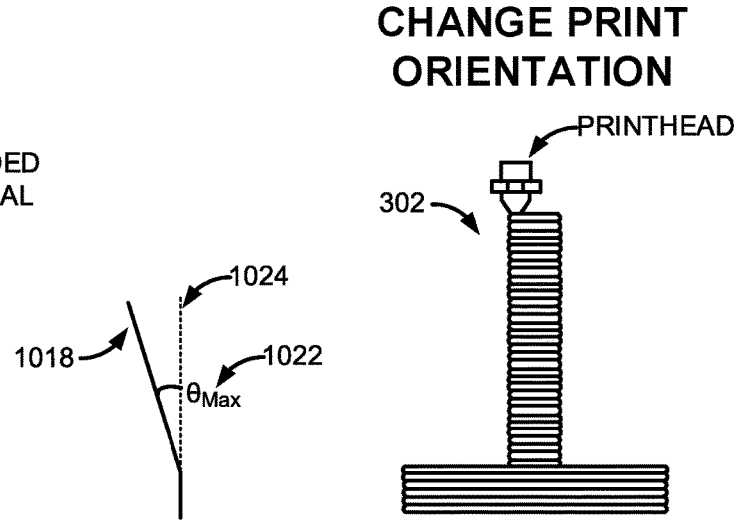
FIG. 10C
FIG. 10D CHANGE PRINT ORIENTATION
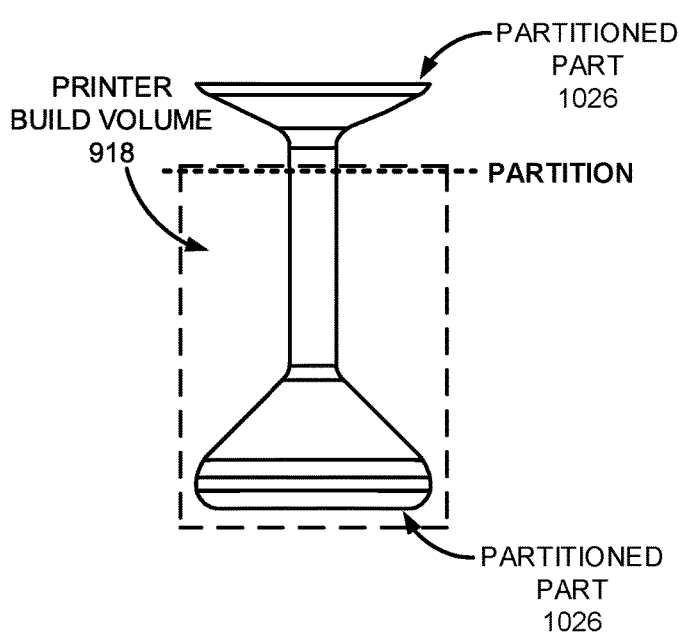
FIG. 10E
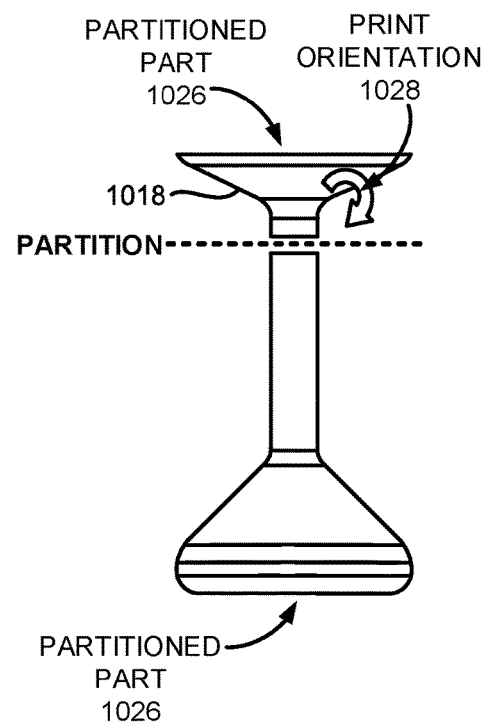
FIG. 10F

SYSTEM AND METHODS FOR MANUFACTURING A CUSTOM LIGHTING PRODUCT

FIELD OF TECHNOLOGY

The present disclosure relates generally to the field of manufacturing lighting products and, more specifically, to improved systems and methods for manufacturing a custom lighting product using three-dimensional (3D) printing and standardized functional components.

BACKGROUND

Lighting products such as table lamps, floor lamps, or wall-mounted lamps are commonly made by traditional manufacturing processes such as injection molding. However, from a cost perspective, traditional manufacturing processes usually require that a manufactured product be mass produced to offset the high overhead costs associated with mold design and tooling. Moreover, once a lighting product is manufactured using a traditional manufacturing process such as injection molding, it is often difficult to change the design of the product without additional overhead costs. While traditional manufacturing processes may be appropriate for making certain types of lights, it is often not appropriate for making design-centered lighting products where consumer tastes vary, or change over time, and limited production runs are preferred by both designers and consumers.

Fused deposition modeling (FDM), also referred to as fused filament fabrication (FFF), is a 3D printing process by which a 3D object is created from a digital model by selectively depositing melted material in a pre-determined manner layer-by-layer. While 3D printing offers an alternative to traditional manufacturing processes for making design-centered lighting products, designers and design firms normally do not have the resources or expertise to 3D print such products themselves. Moreover, 3D printing certain functional components of the lighting product is oftentimes not possible or is cost-prohibitive. Furthermore, lighting products are often designed with features that may not be conducive to the 3D printing process and may require the proposed design be optimized for 3D printing.

Therefore, a solution is needed which addresses the above shortcomings and disadvantages of traditional manufacturing practices and custom 3D printing. Such a solution should take advantage of the efficiencies of certain aspects of traditional manufacturing but also maintain the flexibility of 3D printing processes without requiring high overhead costs. Moreover, the improved manufacturing process should not be overly complicated and should allow design-centered lighting products to be manufactured at scale without sacrificing the quality of such products.

SUMMARY

Disclosed are methods and systems for manufacturing a lighting product using 3D-printed parts and standardized functional components. In one embodiment, a method of manufacturing a lighting product can comprise providing or transmitting 3D computer-aided design (CAD) model files containing 3D CAD models of standardized functional components to a computing device in response to a user input applied at the computing device.

The standardized functional components can be configured to enable the lighting product to operate functionally. In some embodiments, the standardized functional components can comprise a light emitting component (e.g., a light bulb, a light strip, etc.), a light socket, a light actuator, and at least one weight.

The method can also comprise receiving, from the computing device, an assembly CAD model file and a plurality of part CAD model files. The assembly CAD model file can contain a 3D CAD model of the lighting product in an assembled form. The part CAD model files can contain 3D CAD models of constituent parts of the lighting product.

The method can further comprise verifying whether the 3D CAD models contained within the assembly CAD model file and the plurality of part CAD model files satisfy a plurality of design requirements associated with the lighting product. The design requirements can comprise at least whether the 3D CAD models accommodate the standardized functional components and whether the 3D CAD models meet a number of dimension requirements. For example, the step of verifying the 3D CAD models can comprise verifying whether the 3D CAD models meet a minimum wall thickness requirement, a maximum overall part size requirement, a component relief space requirement, and a prohibited overhang design requirement.

The method can also comprise generating a set of optimized CAD model files based on the assembly CAD model file and the plurality of part CAD model files. In some embodiments, the set of optimized CAD model files can be generated if the 3D CAD models contained within the assembly CAD model file and the plurality of part CAD model files do not meet at least one of the design requirements. In other embodiments, the set of optimized CAD model files can be generated even if the 3D CAD models meet the design requirements. The set of optimized CAD model files can be generated to improve a printability of the lighting product or ease an assembly of the lighting product.

The step of generating the set of optimized CAD model files can further comprise at least one of: adding an accommodation for a standardized functional component in one of the 3D CAD models, changing a design of an overhang in one of the 3D CAD models, adding a locating feature to one of the 3D CAD models, and changing a mating feature in one of the 3D CAD models into a different mating feature.

The method can further comprise 3D printing parts of the lighting product using one or more 3D printers. The one or more 3D printers can be programmed to execute machine-readable instructions converted from the set of optimized CAD model files to 3D print the parts.

In some embodiments, the machine-readable instructions can be G-Code instructions. The method can further comprise changing the G-Code instructions pertaining to at least one of a printhead temperature, a print speed, and an extrusion amount after the G-Code instructions are converted from the set of optimized CAD model files.

In certain embodiments, the method can comprise receiving, from the computing device, a material selection concerning a desired material to print a constituent part of the lighting product. The method can further comprise 3D printing the constituent part of the lighting product using a 3D printing filament of the desired material. The desired material can be an opaque 3D printing material or a translucent 3D printing material.

In some embodiments, the lighting product can comprise a light diffuser. The light diffuser can be printed using the translucent 3D printing material.

The method can also comprise assembling the 3D-printed parts together with the standardized functional components to yield the lighting product.

In some embodiments, the method can also comprise receiving, at a cloud computing server, a category selection concerning a lighting product category from the computing device prior to transmitting the 3D CAD model files. The lighting product category can comprise a table light, a wall light, a floor light, a pendant light, and a portable light.

In these and other embodiments, the method can also comprise receiving, at the cloud computing server, a size selection concerning a lighting product size from the computing device. The method can further comprise setting at least some of the dimension requirements based on the category selection and the size selection. For example, the dimension requirements can comprise at least one of a maximum height, a maximum width or depth, and a minimum base footprint width or depth.

In some embodiments, the method can also comprise transmitting, to the computing device, additional 3D CAD model files containing 3D CAD models of component housings configured to house or support the standardized functional components. The additional 3D CAD model files can be transmitted at the same time that the 3D CAD model files of the standardized functional components are transmitted.

Disclosed is also a system for manufacturing a lighting product. The system can comprise a cloud storage configured to store 3D CAD model files containing 3D CAD models of standardized functional components.

The standardized functional components can be configured to enable the lighting product to operate functionally. The standardized functional components can comprise at least a light emitting component, a light socket, a light actuator, and one weight.

The system can also comprise a cloud computing server comprising one or more processors. The cloud computing server can be configured to access the cloud storage.

The one or more processors of the cloud computing server can be programmed to execute instructions to transmit, to a computing device, one or more of the 3D CAD model files of the standardized functional components in response to a user input applied at the computing device. The one or more processors of the cloud computing server can also be programmed to receive, from the computing device, an assembly CAD model file and a plurality of part CAD model files. The assembly CAD model file can contain a 3D CAD model of the lighting product in an assembled form. The part CAD model files can contain 3D CAD models of constituent parts of the lighting product.

The one or more processors of the cloud computing server can also be programmed to verify whether the 3D CAD models contained within the assembly CAD model file and the plurality of part CAD model files satisfy a plurality of design requirements associated with the lighting product. The design requirements can comprise whether the 3D CAD models accommodate the standardized functional components and whether the 3D CAD models meet a number of dimension requirements. For example, verifying the 3D CAD models can comprise verifying whether the 3D CAD models meet a minimum wall thickness requirement, a maximum overall part size requirement, a component relief space requirement, and a prohibited overhang design requirement.

The one or more processors of the cloud computing server can also be programmed to generate a set of optimized CAD model files based on the assembly CAD model file and the plurality of part CAD model files. In some embodiments, the set of optimized CAD model files can be generated if the 3D CAD models contained within the assembly CAD model file and the plurality of part CAD model files do not meet at least one of the design requirements. The set of optimized CAD model files can be generated by adding an accommodation for a standardized functional component in one of the 3D CAD models, changing a design of an overhang in one of the 3D CAD models, adding a locating feature to one of the 3D CAD models, changing a mating feature in one of the 3D CAD models into a different mating feature, or a combination thereof.

In other embodiments, the set of optimized CAD model files can be generated even if the 3D CAD models meet the design requirements. The set of optimized CAD model files can be generated to improve a printability of the lighting product or ease an assembly of the lighting product.

The system can further comprise one or more 3D printers configured to 3D print the constituent parts of the lighting product. The one or more 3D printers can be programmed to execute machine-readable instructions converted from the set of optimized CAD model files to 3D print the parts.

The one or more processors of the cloud computing server can further be programmed to receive, from the computing device, a material selection concerning a desired material to print one of the constituent parts of the lighting product. The 3D printers can be configured to 3D print the part using a 3D printing filament of the desired material.

Also disclosed is a method of 3D printing parts of a lighting product. The method can comprise transmitting 3D computer-aided design (CAD) model files containing 3D CAD models of standardized functional components to a computing device in response to a user input applied at the computing device.

The standardized functional components can be configured to enable the lighting product to operate functionally. In some embodiments, the standardized functional components can comprise a light emitting component (e.g., a light bulb, a light strip, etc.), a light socket, a light actuator, and at least one weight.

The method can also comprise receiving, from the computing device, an assembly CAD model file and a plurality of part CAD model files. The assembly CAD model file can contain a 3D CAD model of the lighting product in an assembled form. The part CAD model files can contain 3D CAD models of constituent parts of the lighting product.

The method can further comprise verifying whether the 3D CAD models contained within the assembly CAD model file and the plurality of part CAD model files satisfy a plurality of design requirements associated with the lighting product. The design requirements can comprise at least whether the 3D CAD models accommodate the standardized functional components and whether the 3D CAD models meet a number of dimension requirements. For example, the step of verifying the 3D CAD models can comprise verifying whether the 3D CAD models meet a minimum wall thickness requirement, a maximum overall part size requirement, a component relief space requirement, and a prohibited overhang design requirement.

The method can also comprise generating a set of optimized CAD model files based on the assembly CAD model file and the plurality of part CAD model files. In some embodiments, the set of optimized CAD model files can be generated if the 3D CAD models contained within the assembly CAD model file and the plurality of part CAD model files do not meet at least one of the design requirements. In other embodiments, the set of optimized CAD model files can be generated even if the 3D CAD models meet the design requirements. The set of optimized CAD model files can be generated to improve a printability of the lighting product or ease an assembly of the lighting product.

The step of generating the set of optimized CAD model files can further comprise at least one of: adding an accommodation for a standardized functional component in one of the 3D CAD models, changing a design of an overhang in one of the 3D CAD models, adding a locating feature to one of the 3D CAD models, and changing a mating feature in one of the 3D CAD models into a different mating feature.

The method can further comprise 3D printing parts of the lighting product using one or more 3D printers. The one or more 3D printers can be programmed to execute machine-readable instructions converted from the set of optimized CAD model files to 3D print the parts.

In some embodiments, the machine-readable instructions can be G-Code instructions. The method can further comprise changing the G-Code instructions pertaining to at least one of a printhead temperature, a print speed, and an extrusion amount after the G-Code instructions are converted from the set of optimized CAD model files.

BRIEF DESCRIPTION OF THE DRAWINGS

FIG. 3D illustrates other embodiments of table lights, wall lights, and floor lights assembled using 3D-printed parts and pre-fabricated functional components.

FIG. 7 illustrates one embodiment of a repository GUI allowing the designer to access an online repository of 3D CAD model files of the functional components and component housings.

FIG. 10B illustrates one example of a prohibited overhang.

FIG. 10C illustrates one example of a maximum overhang angle.

FIG. 10D illustrates one example method of changing a print orientation of a part to mitigate an overhang.

FIG. 10E illustrates one example of partitioning a part of a lighting product to allow the part to fit within a print volume of the 3D printer.

FIG. 10F illustrates one example of partitioning a part of a lighting product into multiple partitioned parts and changing a print orientation of one of the partitioned parts improve a printability of the partitioned part.

DETAILED DESCRIPTION

Figure 1:
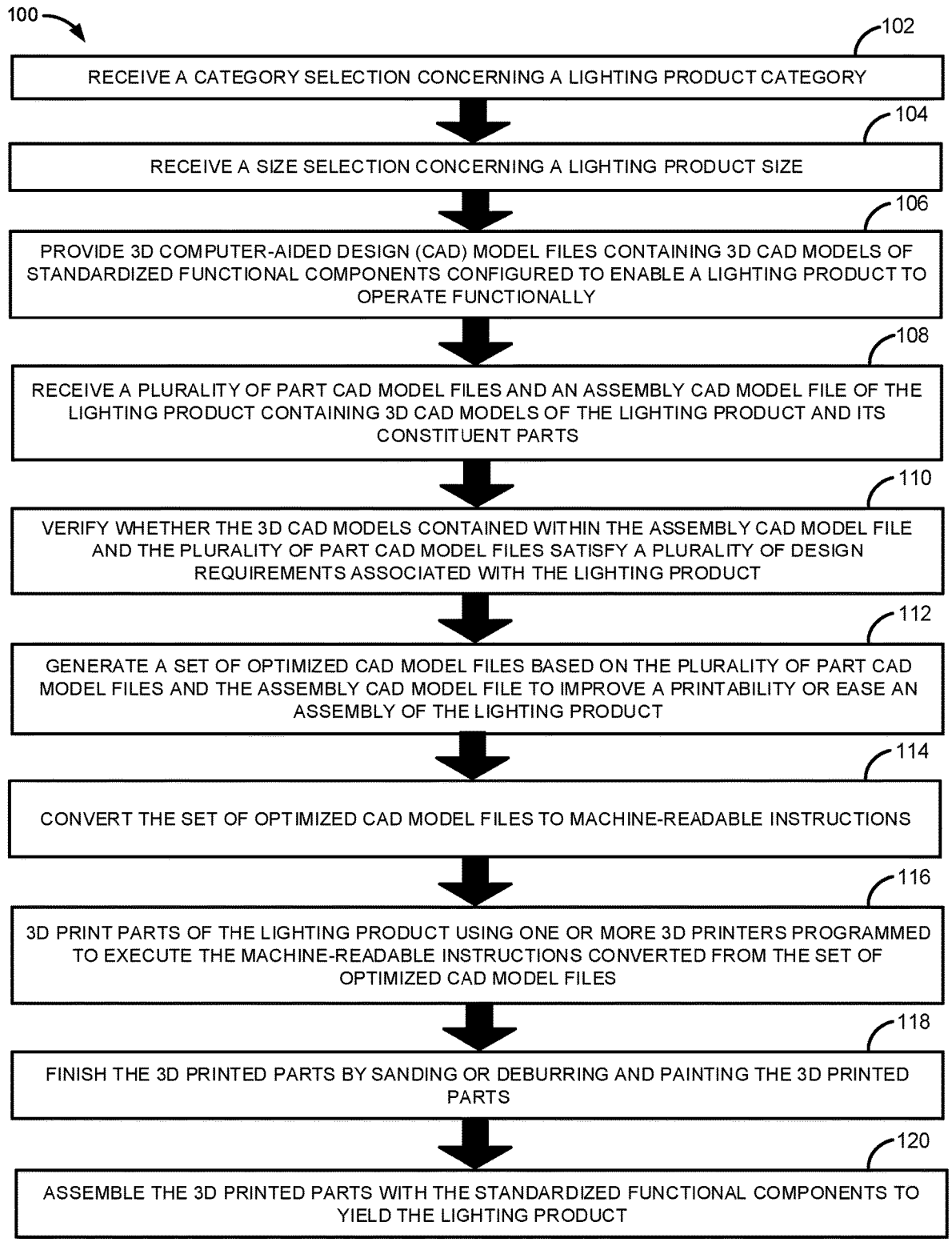
FIG. 1 illustrates one embodiment of a method of manufacturing a lighting product.

FIG. 1 illustrates one embodiment of a method 100 of manufacturing a lighting product 300 (see, e.g., FIGS. 3A-3D for examples of the lighting product 300). The method 100 can be enabled using any of the devices and apparatus shown as part of the system 200 in FIG. 2. The method 100 can be used to manufacture the lighting product 300 using a combination of 3D-printed parts 302 and mass-manufactured or pre-fabricated functional components 304 (see, e.g., FIGS. 3A-3D for examples of the 3D-printed parts 302 and the pre-fabricated functional components 304). For purposes of this disclosure, any references to 3D-printed part(s) 302 can refer to constituent parts of the lighting product 300 printed by a 3D printer or parts of the lighting product 300 designed to be printed by a 3D printer.

One technical problem faced by the applicant is how to manufacture high-quality and aesthetically pleasing lighting products at scale without relying on traditional manufacturing techniques that require high upfront overhead costs. The solution, discovered by the applicant, is a manufacturing process that leverages advanced 3D printing techniques and incorporates pre-fabricated functional lighting components that can be easily integrated with the 3D-printed parts.

Referring back to FIG. 1, the method 100 can comprise receiving a category selection concerning a lighting product category 402 (see, e.g., FIG. 4A) from a computing device 210 of a designer in step 102. In some embodiments, the category selection can be received at a cloud computing server 202 (see, e.g., FIG. 2). The category selection can also be received at a computing device 206 located at a production or manufacturing facility (see, e.g., FIG. 2). The computing device 206 can be a computing device used by a member of the production or manufacturing team (even when not at the production or manufacturing facility). For purposes of the present disclosure, the computing device 206 can also be referred to as a production computing device 206 and the computing device 210 can also be referred to as a designer computing device 210 to distinguish it from the production computing device 206 (see, e.g., FIG. 2).

For purposes of the present disclosure, the term "designer" can refer to any individual that uses the methods or systems disclosed herein to manufacture a lighting product. In some instances, the term "designer" can refer to an individual that designs the lighting product using CAD software or other types of drawing programs. In other instances, the term "designer" can refer to an individual that uses the methods or systems disclosed herein to manufacture a lighting product designed by another individual.

Figure 3A:
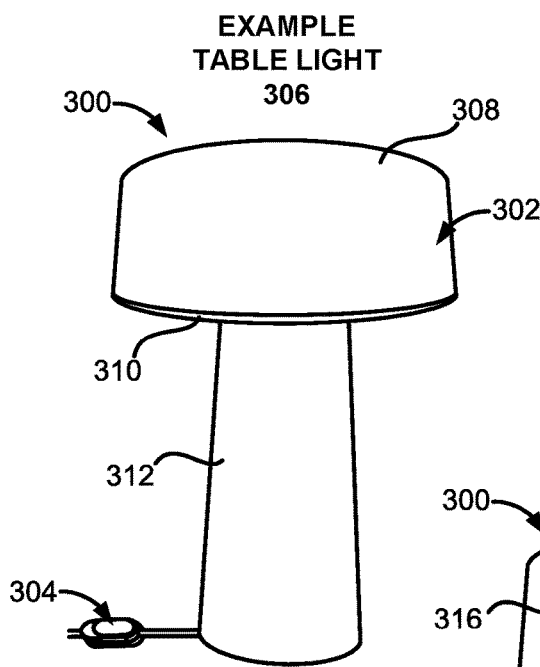
FIG. 3A illustrates one embodiment of a table light assembled using 3D-printed parts and pre-fabricated functional components.
Figure 3B:
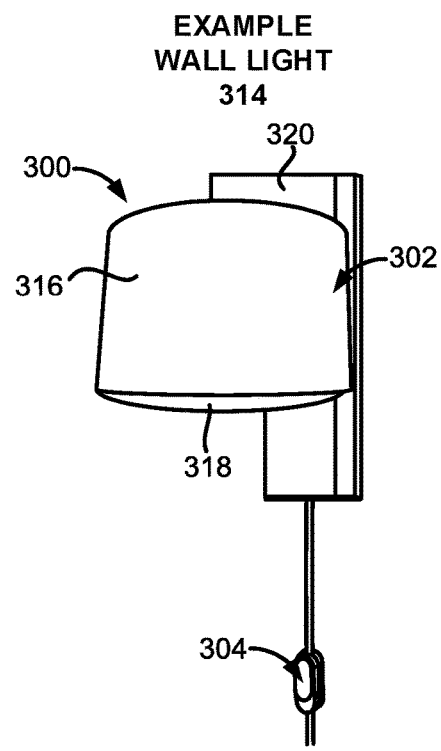
FIG. 3B illustrates one embodiment of a mountable wall light assembled using 3D-printed parts and pre-fabricated functional components.
Figure 3C:
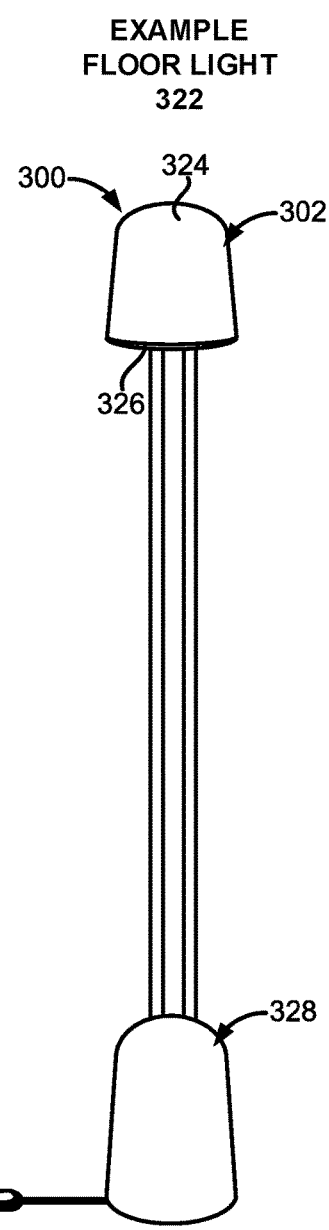
FIG. 3C illustrates one embodiment of a floor light assembled using 3D-printed parts and pre-fabricated functional components.
Figure 4A:
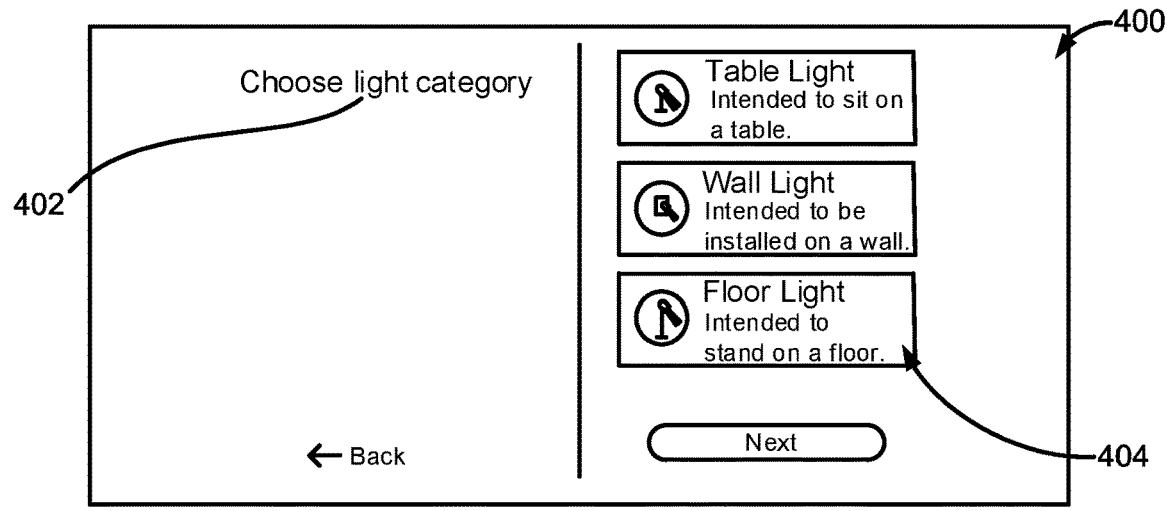
FIG. 4A illustrates one embodiment of a category selection graphical user interface (GUI) allowing a designer to select a lighting product category via a user input.
Figure 4B:
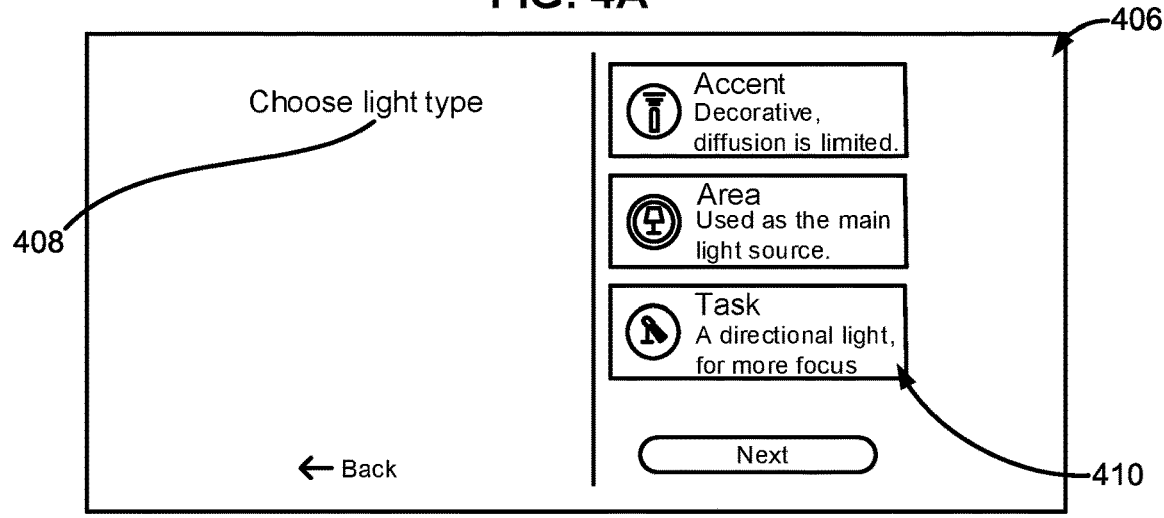
FIG. 4B illustrates one embodiment of a type selection GUI allowing the designer to select a lighting product type via a user input.
Figure 4C:
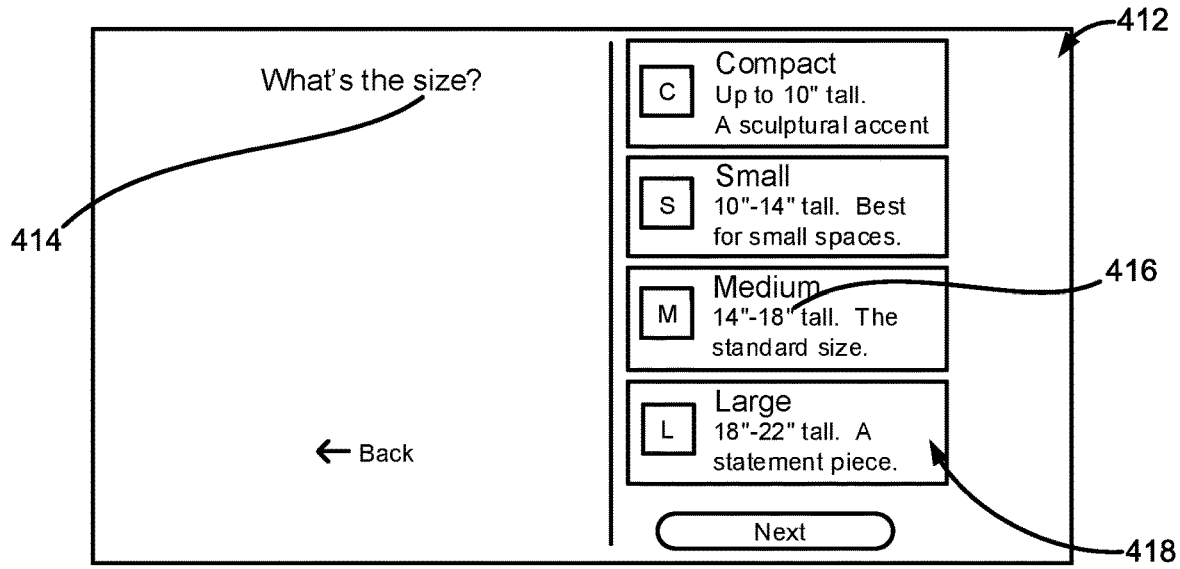
FIG. 4C illustrates one embodiment of a size selection GUI allowing the designer to select a lighting product size via a user input.

The designer can choose from several lighting product categories 402 (see, e.g., FIGS. 4A-4C). The lighting product categories 402 can comprise a table light 306, a wall light 314, and a floor light 322 (see, e.g., FIGS. 3A-3D). The lighting product categories 402 can also comprise a pendant light and a portable light. The table light 306 can be any type of light or lamp that is configured to be placed on a surface such as a table, a desk, a shelf, a ledge, a counter, or a combination thereof. The wall light 314 can be any type of light or lamp configured to be mounted to a wall, ceiling, or other type of structure. For example, the wall light 314 can take the place of a flush-mount light or ceiling light. The floor light 322 can be any type of light that is configured to be placed on a floor or the ground. The floor light 322 can be distinguished from the table light 306 by being greater in height than the table light 306. Each of the table light 306 and the floor light 322 can be freestanding or be configured to lean against one or more surfaces.

The designer can cause the computing device 210 to transmit the category selection when the designer applies a user input to a category selection GUI 400 (see, e.g., FIG. 4A). For example, the designer can apply a touch input or a mouse click to an icon or graphic representing the category selection to select the lighting product category 402. The cloud computing server 202, the production computing device 206, or a combination thereof can receive the category selection in response to the user input applied by the designer.

Although table lights 306, wall lights 314, and floor lights 322 are discussed, it is contemplated by this disclosure that other types of lights such as pendant lights, portable lights, outdoor lights, or vehicle lights such as bicycle lights can also be manufactured using the methods and systems disclosed herein.

The method 100 can also comprise receiving a light type selection concerning a lighting product type 408 (see, e.g., FIG. 4B) from the computing device 210 of the designer in an optional step after step 102. The designer can choose from several lighting product types 408 (see, e.g., FIG. 4B). The lighting product types 408 can comprise an accent light, an area light, and a task light. The accent light can be a type of decorative light where diffusion of the light emitted by the light emitting component (e.g., the light bulb) is limited or reduced. The area light can be a type of light where the light emitted by the light emitting component is used as the main light source for a room or area. The task light can be a type of light where the light emitted by the light emitting component is directed by components of the task light in a specific direction or orientation for more focus.

The designer can cause the computing device 210 to transmit the light type selection when the designer applies a user input to a type selection GUI 406 (see, e.g., FIG. 4B). For example, the designer can apply a touch input or a mouse click to an icon or graphic representing the light type selection to select the lighting product type 408. The cloud computing server 202, the production computing device 206, or a combination thereof can receive the light type selection in response to the user input applied by the designer.

The method 100 can further comprise receiving a size selection concerning a lighting product size 414 (see, e.g., FIG. 4C) from the computer device 210 of the designer in step 104. The size selection can be received at the cloud computing server 202, the production computing device 206, or a combination thereof.

The designer can choose from several lighting product sizes 414. The lighting product sizes 414 can comprise a compact size, a small size, a medium size, and a large size. Each of the lighting product sizes 414 can have a set of bounding dimensions 416 (see, e.g., FIG. 4C) associated with the lighting product size 414. The number of size options (e.g., compact, small, medium, large, etc.) and the bounding dimensions 416 presented to the designer can vary based on the lighting product category 402 and/or the lighting product type 408 selected by the designer.

The designer can cause the computing device 210 to transmit the size selection when the designer applies a user input to a size selection GUI 412 (see, e.g., FIG. 4C). For example, the designer can apply a touch input or a mouse click to an icon or graphic representing the size selection to select the lighting product size 414 (see, e.g., FIG. 4C). The cloud computing server 202, the production computing device 206, or a combination thereof can receive the size selection in response to the user input applied by the designer on the computing device 210.

Once the cloud computing server 202 receives the size selection, the cloud computing server 202 can associate the bounding dimensions 416 (see, e.g., FIG. 4C) corresponding to the size selection with the lighting product 300. The bounding dimensions 416 can later be used to verify that the dimensions of the lighting product 300 represented by the 3D CAD model files received from the designer are within the bounding dimensions 416.

In some embodiments, the category selection GUI 400, the type selection GUI 406, and the size selection GUI 412 (see, e.g., FIGS. 4A-4C) can be provided as part of a web-based portal or workflow accessed by the designer to start the manufacturing process. In other embodiments, the category selection GUI 400, the type selection GUI 406, and the size selection GUI 412 can be provided as part of a mobile application or tablet application accessed by the designer to start the manufacturing process.

The method 100 can also comprise providing 3D CAD model files 702 containing 3D CAD models of a plurality of standardized functional components 304 (see, e.g., FIG. 7) configured to enable the lighting product 300 to operate functionally in step 106. In some embodiments, step 106 can also comprise providing 3D CAD model files 702 containing 3D CAD models of a plurality of component housings 600 configured to house the standardized functional components 304 (see, e.g., FIGS. 6A-6C). The designer can use the 3D CAD models within the 3D CAD model files 702 to determine the shapes and dimensions of the standardized functional components 304 in order to design parts 302 that can accommodate such functional components 304. The designer can also integrate at least portions of the 3D CAD models of the component housings 600 into the design of the parts 302 of the lighting product 300.

In some embodiments, the step of providing the 3D CAD model files 702 can further comprise transmitting the 3D CAD model files 702 containing the 3D CAD models of the standardized functional components 304 to the computing device 210 in response to a user input applied (e.g., a user input applied by the designer) to the computing device 210.

The method 100 can further comprise receiving, at the cloud computing server 202, an assembly CAD model file 802 and a plurality of part CAD model files 806 (see, e.g., FIGS. 8A and 8B) of the lighting product 300 and its constituent parts from the computing device 210 in step 108. For example, the designer can upload the assembly CAD model file 802 through an assembly file upload GUI 800 or webpage (see, e.g., FIG. 8A). The assembly CAD model file 802 can contain a 3D CAD model of the entire lighting product 300.

Figure 8A:
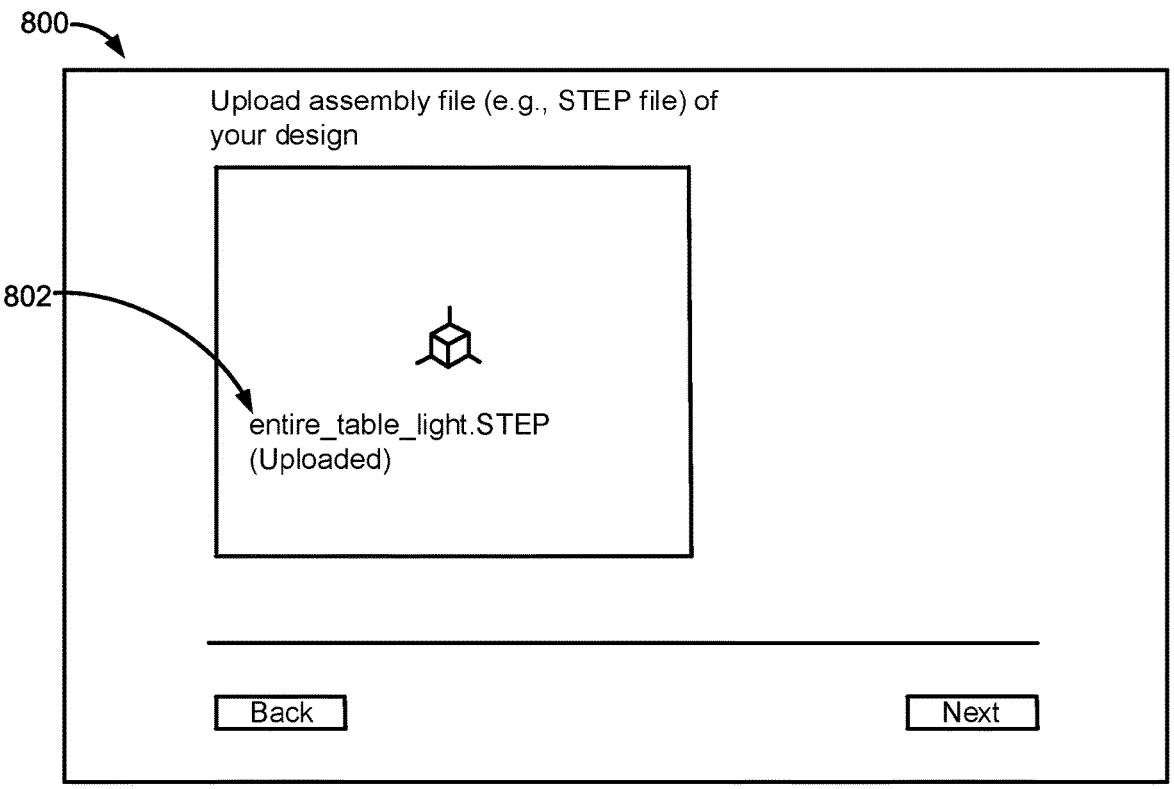
FIG. 8A illustrates one embodiment of an assembly file upload GUI allowing the designer to upload an assembly CAD model file.
Figure 8B:
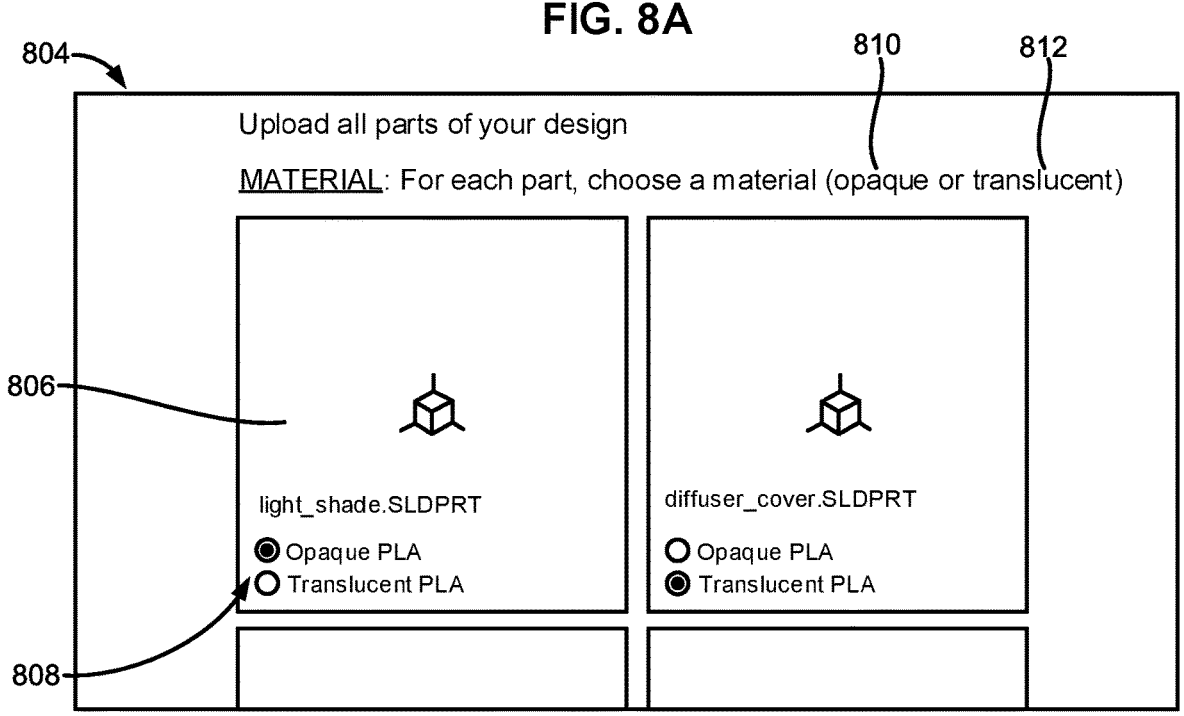
FIG. 8B illustrates one embodiment of a part file upload GUI allowing the designer to upload a plurality of part CAD model files.

The designer can also upload the plurality of part CAD model files 806 through a part file upload GUI 804 or webpage (see, e.g., FIG. 8B). The part CAD model files 806 can comprise 3D CAD models of parts or components of the lighting product 300.

The method 100 can also comprise verifying that the 3D CAD models of the lighting product 300 contained within the plurality of part CAD model files 806 and the assembly CAD model file 802 corresponds to the category selection, the type selection, the size selection, and accommodates the plurality of standardized functional components 304 in step 110. Furthermore, step 110 can also comprise verifying whether the 3D CAD models contained within the plurality of part CAD model files 806 and the assembly CAD model file 802 satisfy a plurality of design requirements associated with the lighting product 300. For example, the verification step can further comprise verifying the lighting product 300 represented by the plurality of part CAD model files 806 and the assembly CAD model file 802 meets requirements concerning a minimum wall thickness, a maximum overall part size, a component relief space, prohibited overhang designs, and prohibited surface textures and patterns. The verification process will be discussed in more detail in later sections.

In some embodiments, this verification step can be performed automatically in software. For example, one or more processors of the cloud computing server 202 can be programmed to verify that the lighting product 300 represented by the plurality of part CAD model files 806 and the assembly CAD model file 802 corresponds to the category selection and the size selection and accommodates the plurality of standardized functional components 304. In certain embodiments, one or more processors of the production computing device 206 can be programmed to verify that the lighting product 300 represented by the plurality of part CAD model files 806 and the assembly CAD model file 802 corresponds to the category selection and the size selection and accommodates the plurality of standardized functional components 304.

In other embodiments, this verification step can be performed semi-automatically where certain verification procedures are performed in software and others are performed by production designers or managers using the production computing device 206.

In additional embodiments, the verification step can be performed by production designers or managers using the production computing device 206.

The method 100 can further comprise generating a set of optimized CAD model files 1004 (see, e.g., FIG. 10A) based on the plurality of part CAD model files 806 and the assembly CAD model file 802 in step 112. The set of optimized CAD model files 1004 can be generated to improve a printability or print quality of the lighting product 300 or ease an assembly of the lighting product 300. The set of optimized CAD model files 1004 can comprise an optimized assembly CAD model file and optimized part CAD model files. The set of optimized CAD model files 1004 can address or fix any issues uncovered as part of the verification step. In one embodiment, the set of optimized CAD model files 1004 can be a revised or updated instance of the plurality of part CAD model files 806 and the assembly CAD model file 802 uploaded by the designer.

In some embodiments, this optimization step can be performed automatically in software. For example, one or more processors of the cloud computing server 202 can be programmed to generate the set of optimized CAD model files 1004 based on the plurality of part CAD model files 806 and the assembly CAD model file 802. In certain embodiments, one or more processors of the production computing device 206 can be programmed to generate the set of optimized CAD model files 1004 based on the plurality of part CAD model files 806 and the assembly CAD model file 802.

In other embodiments, this optimization step can be performed semi-automatically where certain optimization procedures are performed in software (e.g., certain CAD models are updated or revised automatically) and other procedures are performed by production designers or managers using the production computing device 206.

In additional embodiments, the optimization step can be performed by production designers or managers generating the set of optimized CAD model files 1004 using the production computing device 206. The optimization process will be discussed in more detail in later sections.

The method 100 can further comprise converting the set of optimized CAD model files 1004 into machine-readable instructions (e.g., G-Code) capable of being read by the 3D printers 208 in step 114. For example, the 3D printers 208 can be programmed to execute the machine-readable instructions (e.g., the G-Code) to print the constituent parts of the lighting product 300.

The set of optimized CAD model files 1004 can be converted into machine-readable instructions (e.g., G-Code) using a slicing software application or slicer. For example, the slicing software application can be the Cura® software application, the Simplify 3D® software application, or the Slic3r® software application. The slicing software application can also be another type of slicing software customized or specifically written for the manufacturing process disclosed herein.

The method 100 can further comprise an optional step of modifying the machine-readable instructions (e.g., G-Code) used by the 3D printer 208 to print the constituent parts. For example, the G-Code can be modified by changing or revising one or more G-Code instructions/settings used by the 3D printers 208 to print the constituent parts of the lighting product 300. The G-Code instructions and/or G-Code settings can be modified or altered prior to the 3D printers 208 undertaking the 3D printing process.

As a more specific example, one or more G-Code instructions/settings pertaining to at least one of a printhead temperature, a print speed (e.g., a speed at which the printhead is moved), and an extrusion amount (the amount of 3D printing filament extruded by the printhead) can be altered or modified. The method 100 can further comprise changing the G-Code instructions or settings to increase or decrease a printhead temperature, a print speed, and/or an amount of 3D printing material extruded.

In some embodiments, the G-Code instructions or settings pertaining to at least one of the printhead temperature, the print speed, and/or the extrusion amount can be altered or changed when one of the constituent parts of the lighting product 300 is to be printed with a translucent material 812 or translucent 3D printing filament. In other embodiments, the G-Code instructions or settings pertaining to at least one of the printhead temperature, the print speed, and/or the extrusion amount can be altered or changed when one of the constituent parts of the lighting product 300 is to be printed with an opaque material 810 or opaque 3D printing filament. In additional embodiments, the G-Code instructions or settings pertaining to at least one of the printhead temperature, the print speed, and/or the extrusion amount can be altered or changed when one of the constituent parts of the lighting product 300 comprises a particular shape such as a spherical shape or dome shape.

One technical problem faced by those in the 3D-printing industry is that even when 3D CAD models meet certain design requirements and can be printed using a 3D printer, the printed part may not turn out as expected or the print quality of the 3D-printed part may leave much to be desired. One technical solution discovered by the applicant is to add an extra step of changing, altering, or customizing the G-Code instructions pertaining to a printhead temperature, a print speed, and an extrusion amount after the G-Code instructions are converted from the 3D CAD model file (e.g., the set of optimized CAD model files 1004). For example, this can be done when 3D printing hard-to-print parts such as light diffusers printed using translucent 3D printing material.

The method 100 can also comprise 3D printing parts of the lighting product 300 using one or more 3D printers 208 programmed to execute machine-readable instructions (e.g., G-Code instructions) converted from the set of optimized CAD model files 1004 in step 116.

The method 100 can further comprise finishing the 3D-printed parts 302 in step 118. Finishing the 3D-printed parts 302 can comprise sanding or deburring the 3D-printed parts 302. In some embodiments, the 3D-printed parts 302 can be sanded or deburred using a handheld sanding or deburring tool (e.g., a handheld rotatory sander). In other embodiments, the 3D-printed parts 302 can be sanded or deburred using a deburring tumbler or tumbling machine (e.g., a rotary tumbler, a vibratory tumbler, or a rotary and vibratory tumbler with a tumbling media (e.g., a ceramic tumbling media).

Figure 8C:
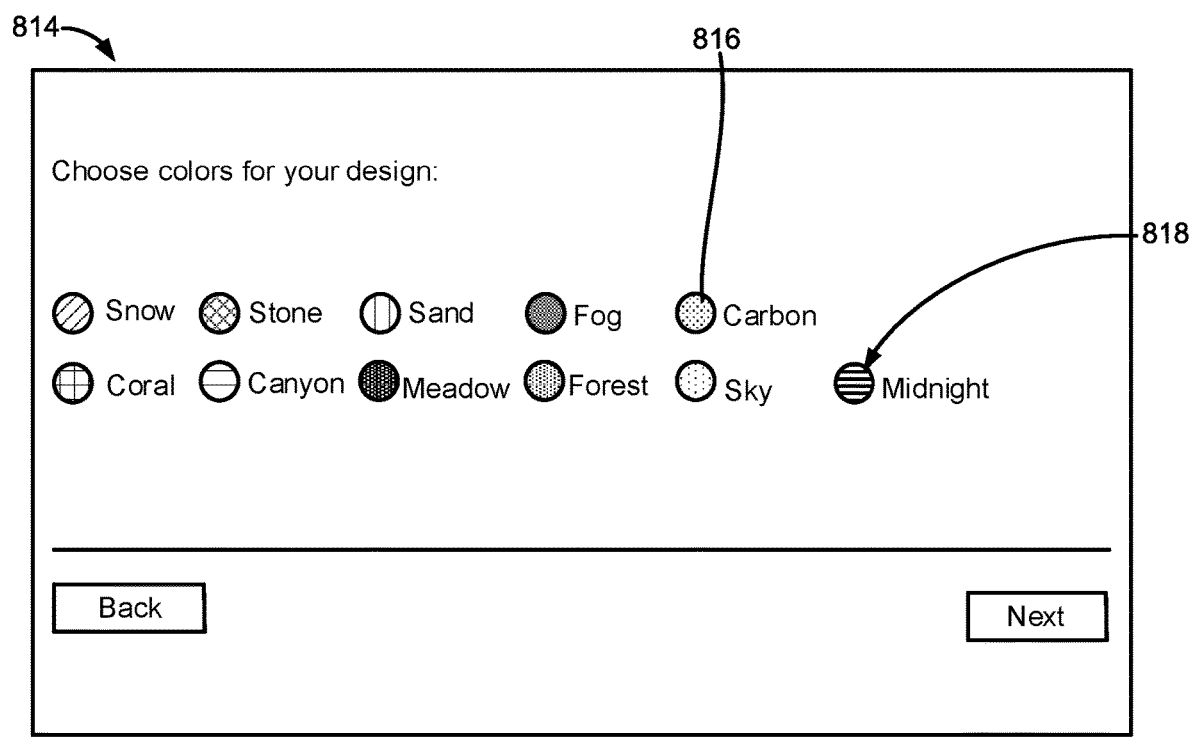
FIG. 8C illustrates one embodiment of a color selection GUI allowing the designer to select one or more colors of the lighting product.

The finishing process can also comprise priming and painting the 3D-printed parts 302 using one or more paint colors selected by the designer (see, e.g., FIG. 8C). In some embodiments, a primer can be applied to the 3D-printed parts 302. In some embodiments, the primer can be applied via spraying. In other embodiments, the primer can be applied via brushing. In certain embodiments, the primer can be a solvent-based primer comprising a mixture of polymers, organic components, and mineral fillers dissolved or dispersed in an organic solvent.

The finishing process can also comprise painting the 3D-printed parts 302 of the lighting product 300 with an industrial-grade paint sprayer or paint gun. The 3D-printed parts 302 can be painted using an acrylic-based paint, an oil-based paint, an enamel paint, a colored lacquer paint, or a combination thereof.

The method 100 can also comprise assembling the 3D-printed parts 302 with the standardized functional components 304 to yield the lighting product 300 in step 120. Assembling the 3D-printed parts 302 with the standardized functional components 304 can comprise fastening, adhering, or otherwise coupling the standardized functional components 304 with the 3D-printed parts 302. The standardized functional components 304 can also be positioned, at least partially, within the component housings 600 of the 3D-printed parts 302. The 3D-printed parts 302 can then be mated, fastened, or otherwise coupled to one another with the standardized functional components 304 secured and housed within the appropriate component housings 600.

Figure 5:
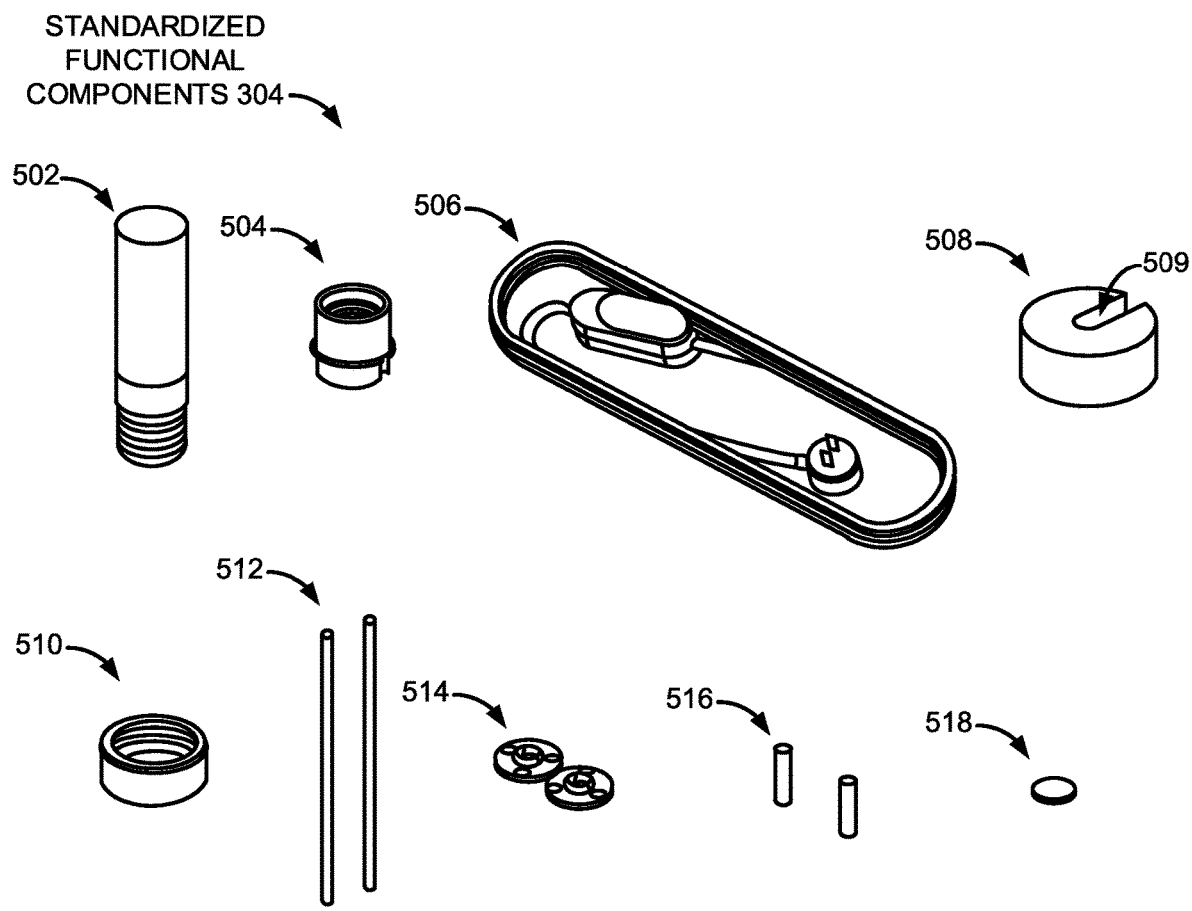
FIG. 5 illustrates perspective views of a plurality of functional components configured to enable the lighting product to operate functionally.

The assembly step can also comprise extending at least one cord connected to the light actuator 506 through one or more channels or conduits defined within the 3D-printed parts 302 and connecting conductive wires of the cord with the light socket 504 (e.g., via conductive clamps or other securement mechanisms) such that the light emitting component 502 fastened to the light socket 504 is electrically coupled to the light actuator 506 (see, e.g., FIG. 5).

The method 100 can further comprise an additional step of testing the lighting product 300 to ensure a safety, durability, and functionality of the lighting product 300.

It will be understood by one of ordinary skill in the art that the method 100 and certain of the method steps disclosed herein can be embodied in a non-transitory readable medium, machine-readable medium, and/or a machine accessible medium comprising instructions compatible, readable, and/or executable by one or more processors of a machine, server, or type of computing device.

Figure 2:
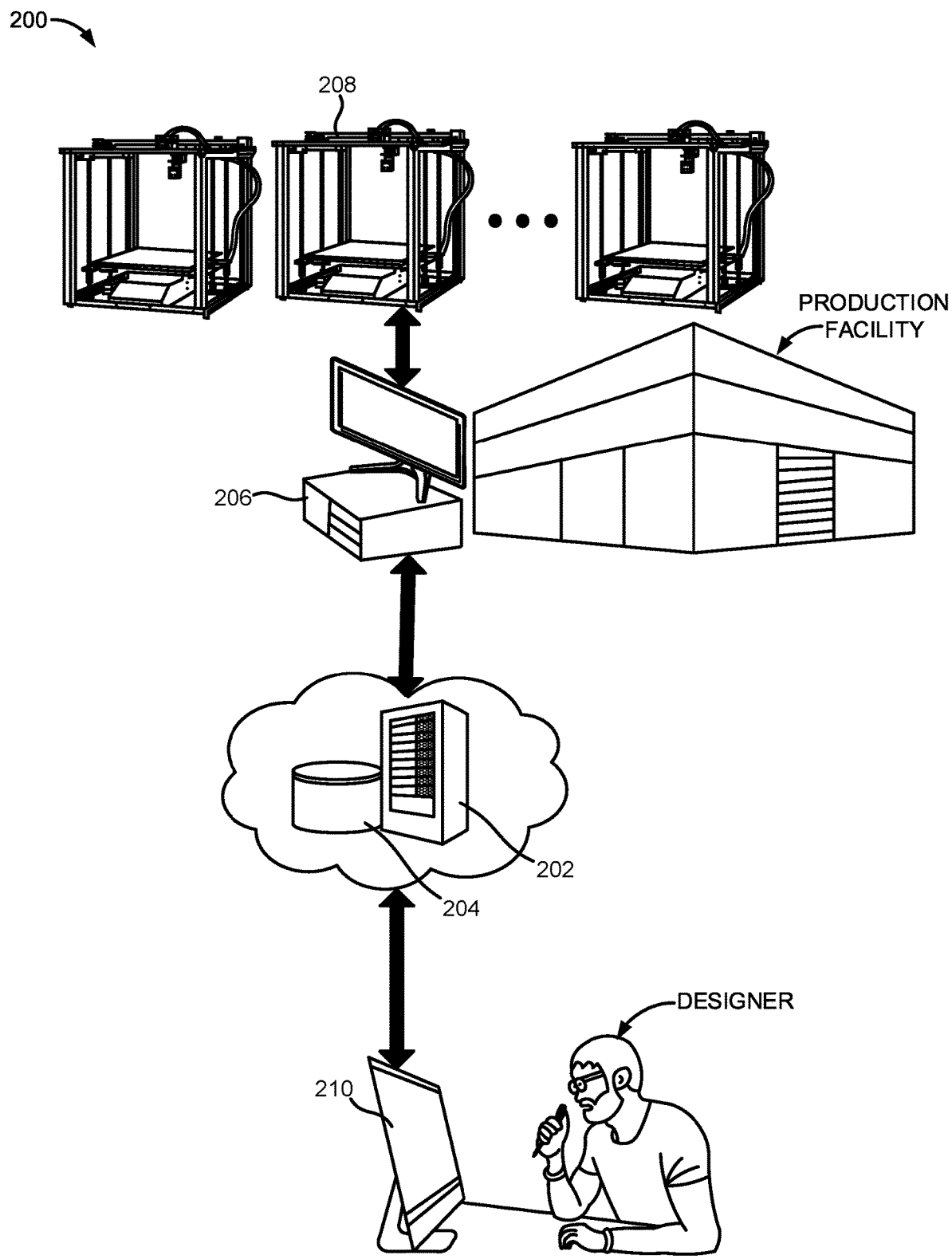
FIG. 2 illustrates one embodiment of a system for manufacturing a lighting product.

FIG. 2 illustrates one embodiment of a system 200 for manufacturing a lighting product 300. The system 200 can comprise a cloud computing server 202, a cloud storage 204, and at least one computing device 206 configured to control or be in communication with one or more 3D printers 208.

In certain embodiments, the computing device 206 and the 3D printers 208 can be located together at a production facility. In other embodiments, the computing device 206 can be located in an office or another environment separate from the production facility housing the 3D printers 208. For purposes of this disclosure, the computing device 206 can also be referred to as a production computing device 206 (even though it is understood that the computing device 206 can be located in another location separate from the production facility housing the 3D printers 208).

In some embodiments, the production computing device 206 can be a desktop computer or a laptop computer. In other embodiments, the production computing device 206 can be a high-performance tablet computer or any portable electronic device capable of generating or manipulating computer-aided design (CAD) files.

The cloud computing server 202 can be or refer to one or more virtualized computing resources or cloud-based servers hosted, supported and/or provided by a cloud computing platform or service (e.g., Amazon Web Services®, Microsoft Azure®, or Google Cloud®). In these and other embodiments, the actual server hardware of the cloud computing server 202 can be one or more server computers (e.g., blade servers or rack-mounted servers) located in a data center, server farm/cluster, or dedicated server facility. Any references to the cloud computing server 202 can also refer to the actual server hardware located in such facilities and any references to the one or more processors of the cloud computing server 202 can refer to the one or more processors of such server hardware. Moreover, any references to tasks or operations undertaken by the cloud computing server 202 can refer to the same tasks or operations undertaken by the one or more processors of the actual server hardware.

In other embodiments, any of the tasks or operations undertaken or performed by the cloud computing server 202 can also be undertaken or performed by one or more standalone servers, mainframes, and/or dedicated desktop or laptop computers. For example, any of the tasks or operations undertaken by the cloud computing server 202 can also be undertaken or performed by a standalone server located at the production facility.

The cloud computing server 202 can store or retrieve data, files, or information to or from the cloud storage 204. The cloud computing server 202 can also store data, information, and files received from other devices in one or more cloud-based databases (e.g., an Amazon Web Services® cloud-based database, a Google Cloud® database, a Microsoft Azure® cloud-based database, etc.). For example, the cloud-based database can be a relational database, a key-value database, a document database, or a graph database.

As shown in FIG. 2, the designer computing device 210 can transmit data, information, or files to the cloud computing server 202 and receive data, information, or files from the cloud computing server 202.

In some embodiments, the designer computing device 210 can be a desktop computer or a laptop computer. In other embodiments, the designer computing device 210 can be a high-performance tablet computer or any portable electronic device capable of generating or manipulating computer-aided design (CAD) files.

The cloud computing server 202 can communicate with or be communicatively coupled to the designer computing device 210, the production computing device 206, and the cloud storage 204 over one or more networks. The one or more networks can refer to one or more wide area networks (WANs) such as the Internet or other smaller WANs, wireless local area networks (WLANs), local area networks (LANs), wireless personal area networks (WPANs), system-area networks (SANs), metropolitan area networks (MANs), campus area networks (CANs), enterprise private networks (EPNs), virtual private networks (VPNs), multi-hop networks, or a combination thereof. The production computing device 206 can connect to the networks using any number of wired (e.g., Ethernet, fiber optic cables, etc.) or wireless connections. The wireless connections can be established using a wireless communication protocol or standard such as a 3G wireless communication standard, a 4G wireless communication standard, a 5G wireless communication standard, a long-term evolution (LTE) wireless communication standard, a Bluetooth™ (IEEE 802.15.1) or Bluetooth™ Lower Energy (BLE) short-range communication protocol, a wireless fidelity (WiFi) (IEEE 802.11) communication protocol, an ultra-wideband (UWB) (IEEE 802.15.3) communication protocol, a ZigBee™ (IEEE 802.15.4) communication protocol, or a combination thereof.

In some embodiments, the production computing device 206 can communicate with the 3D printers 208 over wired connections or the one or more networks including a short-range wireless communication network such as a WiFi network or Bluetooth™.

The designer computing device 210 and the production computing device 206 can transmit data, files, or information to the cloud computing server 202 and receive data, files, or information from the cloud computing server 202 via secure connections. The secure connections can be real-time bidirectional connections secured using one or more encryption protocols such as a secure sockets layer (SSL) protocol, a transport layer security (TLS) protocol, or a combination thereof. Additionally, data or packets transmitted over the secure connection can be encrypted using a Secure Hash Algorithm (SHA) or another suitable encryption algorithm.

As part of the manufacturing process, the cloud computing server 202 can generate a number of user interface pages to be rendered through a web browser or software application (e.g., a mobile application or tablet application) running on the designer computing device 210.

The user interface pages can receive or obtain selections from the designer concerning a category, type, and/or size of the lighting product 300 desired to be manufactured by the designer. The cloud computing server 202 can then present or recommend certain standardized functional components 304 (see, e.g., FIG. 5) to the designer based on the selections made by the designer. The cloud computing server 202 can also make 3D CAD model files 702 (see, e.g., FIG. 7) of the standardized functional components 304 available for download by the designer computing device 210 through an online download page. The 3D CAD model files can be stored in the cloud storage 204.

Once the designer has finished the design of the lighting product 300, the designer can upload an assembly CAD model file 802 and a plurality of part CAD model files 806 (see, e.g., FIGS. 8A and 8B) of the lighting product 300 to the cloud computing server 202. The uploaded assembly CAD model file 802 and part CAD model files 806 can be stored in the cloud storage 204.

At this point, the cloud computing server 202 can verify that the lighting product 300 represented by the part CAD model files 806 and the assembly CAD model file 802 corresponds to the selections made by the designer and accommodates the standardized functional components 304 recommended by the cloud computing server 202. As part of the verification process, the cloud computing server 202 can also verify that the part CAD model files 806 and the assembly CAD model file 802 meet certain design verification requirements.

After the verification process, either the cloud computing server 202, the production computing device 206, or a combination thereof can generate a set of optimized CAD model files 1004 based on the part CAD model files 806 and the assembly CAD model file 802 uploaded by the designer. The set of optimized CAD model files 1004 can be new or revised instances of the part CAD model files 806 and the assembly CAD model file 802 that improves a printability or print quality of the lighting product 300 or makes the lighting product 300 easier to assemble. The set of optimized CAD model files 1004 can then be converted from digital CAD model files into machine-readable or printer-readable software instructions in a machine-readable or 3D-printer-readable format (e.g., G-Code instructions) using a slicer program (e.g., a G-Code slicer program).

One or more 3D printers 208 can then be used to print parts of the lighting product 300 based on the machine-readable instructions. The 3D-printed parts 302 can then be finished and assembled with the standardized functional components 304 to make the lighting product 300.

In some embodiments, at least one of the 3D printers 208 can be a cartesian 3D printer. Cartesian 3D printers are named for the three-axes Cartesian coordinate system that uses x, y, z coordinates to determine the location of the printhead. Cartesian printers are often built with rails that allow the printhead to move in the x- and y-dimensions and actuators that move the printhead up or down in the z-dimension.

In other embodiments, at least one of the 3D printers 208 can be a delta 3D printer. Delta 3D printers usually rely three arms that move up and down on vertical rails arranged in a triangular formation. Each arm can move up and down the rails, independently of one another. Delta printers use trigonometric functions based on the angles created by these arms to determine the location of the printhead within the 3D print space.

In additional embodiments, at least one of the 3D printers 208 can be a cylindrical-coordinate 3D printer. The cylindrical-coordinate 3D printer can be any of the 3D printers disclosed in International Publication No. WO 2021/025939, published on Feb. 11, 2021, the content of which is incorporated herein by reference in its entirety. For example, the cylindrical-coordinate 3D printer can comprise a rotatable printbed support assembly, a vertically-translatable base plate configured to support the printbed support assembly, a plurality of rail segments positioned above the printbed support assembly and aligned radially with the printbed support assembly, and at least one gantry carrier configured to move along each of the rail segments. In some embodiments, at least two of the gantry carriers can be configured to be moved simultaneously. Each of the gantry carrier can be configured to carry or support a printhead the gantry carrier.

FIGS. 3A-3D illustrate embodiments of lighting products 300 that can be manufactured using 3D-printed parts 302 and pre-fabricated or mass manufactured functional components 304. For example, FIG. 3A illustrates one embodiment of a table light 306 assembled using 3D-printed parts 302 and pre-fabricated functional components 304. For example, the table light 306 can comprise functional components 304 made using traditional manufacturing techniques or practices (see, e.g., FIG. 5 and FIGS. 6A-6C for specific examples of functional components 304).

The table light 306 can comprise at least a table light shade 308, a table light diffuser 310, and a table light base 312 printed using a fused deposition modeling (FDM) or 3D printing process. As will be discussed in more detail in the following sections, the design of the 3D-printed parts 302 can be verified to ensure that the 3D-printed parts 302 can accommodate the pre-fabricated functional components 304. Moreover, the design of the 3D-printed parts 302 can also be optimized to enhance a printability of the parts or make the parts easier to assemble.

FIG. 3B illustrates one embodiment of a mountable wall light 314 assembled using 3D-printed parts 302 and pre-fabricated functional components 304. As shown in FIG. 3B, the wall light 314 can comprise at least a wall light shade 316, a wall light diffuser 318, and a wall mounting arm 320 printed using a 3D printing process.

FIG. 3C illustrates one embodiment of a floor light 322 assembled using 3D-printed parts 302 and pre-fabricated functional components 304. As shown in FIG. 3C, the floor light 322 can comprise at least a floor light shade 324, a floor light diffuser 326, and a floor light base 328 printed using a 3D printing process.

FIG. 3D illustrates other embodiments of table lights 306, wall lights 314, and floor lights 322 assembled using 3D-printed parts 302 and pre-fabricated functional components 304. As shown in FIG. 3D, the lights manufactured using the methods and systems disclosed herein can look dramatically different from one another (even when compared to lights within the same lighting product category) from an aesthetic standpoint but can operate using the same standardized functional components 304.

FIG. 3D clearly shows that one of the technical advantages of the manufacturing process disclosed herein is that designers are able to take advantage of the manufacturing process to produce lighting products 300 of differing styles and aesthetics at scale without having to invest in expensive tooling or molds. Such designers can test out multiple designs (even within the same lighting product category 402) to see which lighting products appeal to customers.

FIG. 3D also shows that another technical advantage of the manufacturing process disclosed herein is that the process can produce 3D-printed light diffusing components or light diffusers of various shapes and configurations. For example, 3D-printed light diffusing components or light diffusers can be produced that are spherical in shape, cylindrical in shape, disk-shaped, dome-shaped, ovoid-shaped, or shaped as a polyhedron. Moreover, the manufacturing process disclosed herein can also produce 3D-printed light diffusing components or light diffusers having grooves, ridges, or divots defined along a surface of the diffusing component or light diffuser.

FIG. 4A illustrates one embodiment of a category selection GUI 400. In some embodiments, the category selection GUI 400 can be rendered through a web browser running on the designer computing device 210. In other embodiments, the category selection GUI 400 can be rendered through a software application (e.g., a mobile application or table application) running on the designer computing device 210. The cloud computing server 202 can dynamically generate the content used to populate the category selection GUI 400 in response to a request received from the web browser or software application running on the designer computing device 210.

As shown in FIG. 4A, the category selection GUI 400 can present the designer with a plurality of lighting product categories 402 to choose from. As previously discussed, the lighting product categories 402 can comprise a table light 306, a wall light 314, and a floor light 322 (see, e.g., FIGS. 3A-3D). The lighting product categories 402 can be presented as part of the category selection GUI 400 through a number of category selection graphics 404 or icons. The designer can cause the designer computing device 210 to transmit a category selection when the designer applies a user input to one of the category selection graphics 404. For example, the designer can apply a touch input or a mouse click to a particular category selection graphic 404 to select a lighting product category 402. The cloud computing server 202 can receive the category selection in response to the user input applied by the designer. The cloud computing server 202 can store the category selection in a cloud-based database.

Although FIG. 4A illustrates table lights 306, wall lights 314, and floor lights 322 as possible lighting product categories 402, it is contemplated by this disclosure that other categories of lights such as outdoor lights, vehicle lights (e.g., bicycle lights), or portable lights can also be manufactured using the methods and systems disclosed herein.

FIG. 4B illustrates one embodiment of a type selection GUI 406. In some embodiments, the type selection GUI 406 can be rendered through a web browser running on the designer computing device 210. In other embodiments, the type selection GUI 406 can be rendered through a software application (e.g., a mobile application or table application) running on the designer computing device 210. The cloud computing server 202 can dynamically generate the content used to populate the type selection GUI 406 in response to the category selection received from the designer computing device 210.

As shown in FIG. 4B, the type selection GUI 406 can present the designer with a plurality of lighting product types 408 to choose from. As previously discussed, the lighting product types 408 can comprise an accent light, an area light, and a task light. As previously discussed, the accent light can be a type of decorative light where diffusion of the light emitted by the light emitting component is limited or reduced. The area light can be a type of light where the light emitted by the light emitting component is used as the main light source for a room or area. The task light can be a type of light where the light emitted by the light emitting component is directed by components of the task light in a specific direction or orientation for more focus.

The lighting product types 408 can be presented as part of the type selection GUI 406 through a number of type selection graphics 410 or icons. The designer can cause the designer computing device 210 to transmit a type selection when the designer applies a user input to one of the type selection graphics 410. For example, the designer can apply a touch input or a mouse click to a particular type selection graphic 410 to select a lighting product type 408. The cloud computing server 202 can receive the type selection in response to the user input applied by the designer. The cloud computing server 202 can store the type selection in a cloud-based database.

Although FIG. 4B illustrates accent lights, area lights, and task lights as possible lighting product types 408, it is contemplated by this disclosure that other types of lights can also be manufactured using the methods and systems disclosed herein.

FIG. 4C illustrates one embodiment of a size selection GUI 412. In some embodiments, the size selection GUI 412 can be rendered through a web browser running on the designer computing device 210. In other embodiments, the size selection GUI 412 can be rendered through a software application (e.g., a mobile application or table application) running on the designer computing device 210. The cloud computing server 202 can dynamically generate the content used to populate the size selection GUI 412 in response to the category selection and/or light type selection received from the designer computing device 210.

As shown in FIG. 4C, the size selection GUI 412 can present the designer with a plurality of lighting product sizes 414 to choose from. As previously discussed, the lighting product sizes 414 can comprise a compact size, a small size, a medium size, and a large size.

Each of the lighting product sizes 414 can have a set of bounding dimensions 416 associated with the lighting product size 414. The number of size options (e.g., compact, small, medium, large, etc.) and the bounding dimensions 416 presented to the designer can vary based on the lighting product category 402 and/or the lighting product type 408 selected by the designer.

For example, when the designer selects a table light 306 as the lighting product category 402 and an accent light as the lighting product type 408, the bounding dimensions 416 of the compact table light can be up to 10 inches or 10.5 inches tall and up to 8 inches or 8.5 inches wide, and have a minimum base footprint width/depth of about 4 inches. Moreover, when the designer selects a small-sized table light, the bounding dimensions 416 can be up to between 10 inches to 14 inches tall and up to 10 inches wide and have a minimum base footprint width/depth of about 4 inches. When the designer selects a medium-sized table light, the bounding dimensions 416 can be up to between 14 inches to 18 inches tall and up to 10 inches wide and have minimum base footprint width/depth of about 4 inches. Furthermore, when the designer selects a large-sized table light, the bounding dimensions 416 can be up to between 18 inches to 22 inches tall and up to 12 inches wide and have a minimum base footprint width/depth of about 4 inches.

Table 1 below lists additional bounding dimensions 416 of various lighting product sizes 414 by lighting product category 402.

TABLE 1

BOUNDING DIMENSIONS OF VARIOUS LIGHTING PRODUCT SIZES BY LIGHTING PRODUCT CATEGORY

| Lighting Product Size | Table Light | Wall Light | Floor Light |
|---|---|---|---|
| Compact | Max. Height: ~10.5"<br>Max. Width: ~8.5"<br>Min. Base Footprint Width/Depth: ~4.0" | N/A | N/A |
| Small | Max. Height: ~10.5" to 14.0"<br>Max. Width: ~10.0"<br>Min. Base Footprint Width/Depth: ~4.0" | Max. Height: ~5.0" to 10.0"<br>Max. Width: ~10.0"<br>Max. Depth: ~8.0"<br>Min. Base Footprint Width/Depth: ~5.0" | Max. Height: ~40.0" to 50.0"<br>Max. Width/Depth: ~13.5" |
| Medium | Max. Height: ~14.0" to 18.0"<br>Max. Width: ~10.0"<br>Min. Base Footprint Width/Depth: ~4.0" | N/A | Max. Height: ~50.0" to 60.0"<br>Max. Width/Depth: ~13.5" |
| Large | Max. Height: ~18.0" to 22.0"<br>Max. Width: ~12.0"<br>Min. Base Footprint Width/Depth: ~4.0" | Max. Height: ~10.0" to 15.0"<br>Max. Width: ~15.0"<br>Max. Depth: ~12.0"<br>Min. Base Footprint Width/Depth: ~4.0" | Max. Height: ~60.0" to 70.0"<br>Max. Width/Depth: ~13.5" |

As shown in Table 1 above, the bounding dimensions 416 can comprise at least one of a maximum height, a maximum width, a maximum depth, and a minimum base footprint width or depth.

The lighting product sizes 414 can be presented as part of the size selection GUI 412 through a number of size selection graphics 418 or icons. The designer can cause the designer computing device 210 to transmit a size selection when the designer applies a user input to one of the size selection graphics 418. For example, the designer can apply a touch input or a mouse click to a particular size selection graphic 418 to select a lighting product size 414. The cloud computing server 202 can receive the size selection in response to the user input applied by the designer. The cloud computing server 202 can store the size selection in a cloud-based database.

Once the cloud computing server 202 receives the size selection, the cloud computing server 202 can associate the bounding dimensions 416 corresponding to the size selection with the lighting product 300. The bounding dimensions 416 can later be used to verify that the dimensions of the lighting product 300 represented by the 3D CAD model files received from the designer are within the bounding dimensions 416.

Although FIG. 4C illustrates certain size categories (e.g., compact, small, medium, and large) and specific dimensions associated with such size categories, it is contemplated by this disclosure that lighting products 300 of other size categories (e.g., extra-large lights or miniature-sized lights) and other dimensions can also be manufactured using the methods and systems disclosed herein.

FIG. 5 illustrates perspective views of a plurality of functional components 304 configured to enable the lighting product 300 to operate functionally. In some embodiments, the functional components 304 can be pre-fabricated or mass-manufactured. In these embodiments, the functional components 304 can be manufactured or fabricated prior to manufacturing process used to manufacture the lighting product 300. For example, the functional components 304 can be procured from a supplier or vendor of such components or can be manufactured using traditional manufacturing techniques including injection molding, mold casting, die casting, metal casting, extrusion, computer numerical control (CNC) milling, forging, sheet metal stamping, or a combination thereof. In certain embodiments, the functional components 304 can be manufactured without undergoing a 3D printing process (i.e., the functional components 304 are non-3D printed parts).

In other embodiments, at least part of a functional component 304 can be produced using a 3D printing process.

The functional components 304 can be standardized such that the same functional components 304 can be used for different lighting products 300, including lighting products 300 in different lighting product categories 402. The standardized functional components 304 can comprise, in some embodiments, a light emitting component 502, a light socket 504, a light actuator 506 and cord, and at least one weight 508 for stabilizing the lighting product 300.

In these and other embodiments, the standardized functional components 304 can also comprise a light socket holder 510, rods 512 for raising the height of the lighting product 300, rod securement flanges 514, rod connectors 516, a wall mount hook 614 (see, e.g., FIG. 6B) for securing the wall light 314 to a wall or surface, and rubber pads 518 to be placed on a bottom of the base of the lighting product 300.

Different sized light emitting components 502 can be provided as options based on a combination of the lighting product category 402, the lighting product type 408, and the lighting product size 414 selected by the designer. For example, the light emitting component 502 can be a light bulb having an E26-type screw base (e.g., an 8.5 watt E26 light-emitting diode (LED) bulb). The light emitting component 502 can also be a bulb having an E12-type screw base (e.g., a 6 watt E12 LED bulb). In certain embodiments, the light emitting component 502 can be an incandescent light bulb, a compact fluorescent light bulb, an LED strip, or any other types of light bulb or light strips configured to be mated to the standardized light socket 504 or electronic interface.

Different sized light sockets 504 can also be provided as options based on a combination of the lighting product category 402, the lighting product type 408, and the lighting product size 414 selected by the designer. For example, the light socket 504 can be an E26 light socket or an E12 light socket.

Similarly, different sized light socket holders 510 can also be provided as options based on a combination of the lighting product category 402, the lighting product type 408, and the lighting product size 414 selected by the designer. In some embodiments, the light socket holder 510 can be incorporated as part of a 3D-printed part 302 of the lighting product 300.

The standardized functional components 304 can also comprise a light actuator 506 and cord accompanying the light actuator 506. In some embodiments, the light actuator 506 can be a slidable actuator having a translatable slide bar for controlling or dimming the amount of light emitted. In other embodiments, the light actuator 506 can be a toggle actuator having a toggle switch, a rotary actuator having a rotatable knob, or any combination of a slidable actuator, toggle actuator, and rotary actuator. In further embodiments, the light actuator 506 can comprise a wireless communication unit configured to receive wireless signals from a portable electronic device such as a smartphone, a tablet, or other computing device to control an ON/OFF function or dim level of the lighting product 300.

The light actuator 506 can have one or more cords extending from a body of the light actuator 506. The cords can have conductive wires (e.g., copper wires) that can engage with conductive clamps (e.g., copper plates) or other securement mechanisms of the light socket 504. At least a segment of one such cord can extend through the 3D-printed parts 302 of the lighting product 300 to carry the conductive wires to the light socket 504. A distal end of the cord or another cord can comprise an electrical plug (e.g., a Type A plug or other type of plug) configured to be plugged into an outlet such as a wall outlet.

The standardized functional components 304 can further comprise at least one weight 508. The weight 508 can be made in part of a metallic material (e.g., iron, stainless steel, etc.), a high-density polymeric material, or a combination thereof. The weight 508 can be used to stabilize or balance a base of the lighting product such as a table light base 312 or a floor light base 328.

As shown in FIG. 5, the weight 508 can be substantially cylindrical-shaped and have a weight cutout 509 or cavity extending radially inward. The weight cutout 509 or cavity can allow the cord of the light actuator 506 to extend internally through the base of the lighting product 300.

In some embodiments, the weight 508 can be approximately 2 pounds (lbs.). In other embodiments, the weight 508 can be between 1 lb. and 2 lbs. or greater than 2 lbs. (e.g., 3 lbs., 4 lbs., 5 lbs., or greater).

The lighting product 300 can be assembled with multiple weights 508 (e.g., two to four weights 508) when the height of the lighting product 300 exceeds a preset height threshold or when a design of the lighting product 300 necessitates additional stabilization.

One technical advantage of the methods and systems disclosed herein is that a wide-variety of high-quality, design-centered lighting products can be manufactured by combining a multitude of 3D-printed parts 302 (see, e.g., FIGS. 6A-6C) with the small number of standardized functional components 304 shown in FIG. 5. Besides the standardized functional components 304, the remainder of the lighting product 300 (e.g., the table light, wall light, or floor light) can be printed with a 3D printer (e.g., a cartesian 3D printer, a delta 3D printer, or a cylindrical-coordinate 3D printer) using a polymeric or metallic printing filament.

Figure 6A:
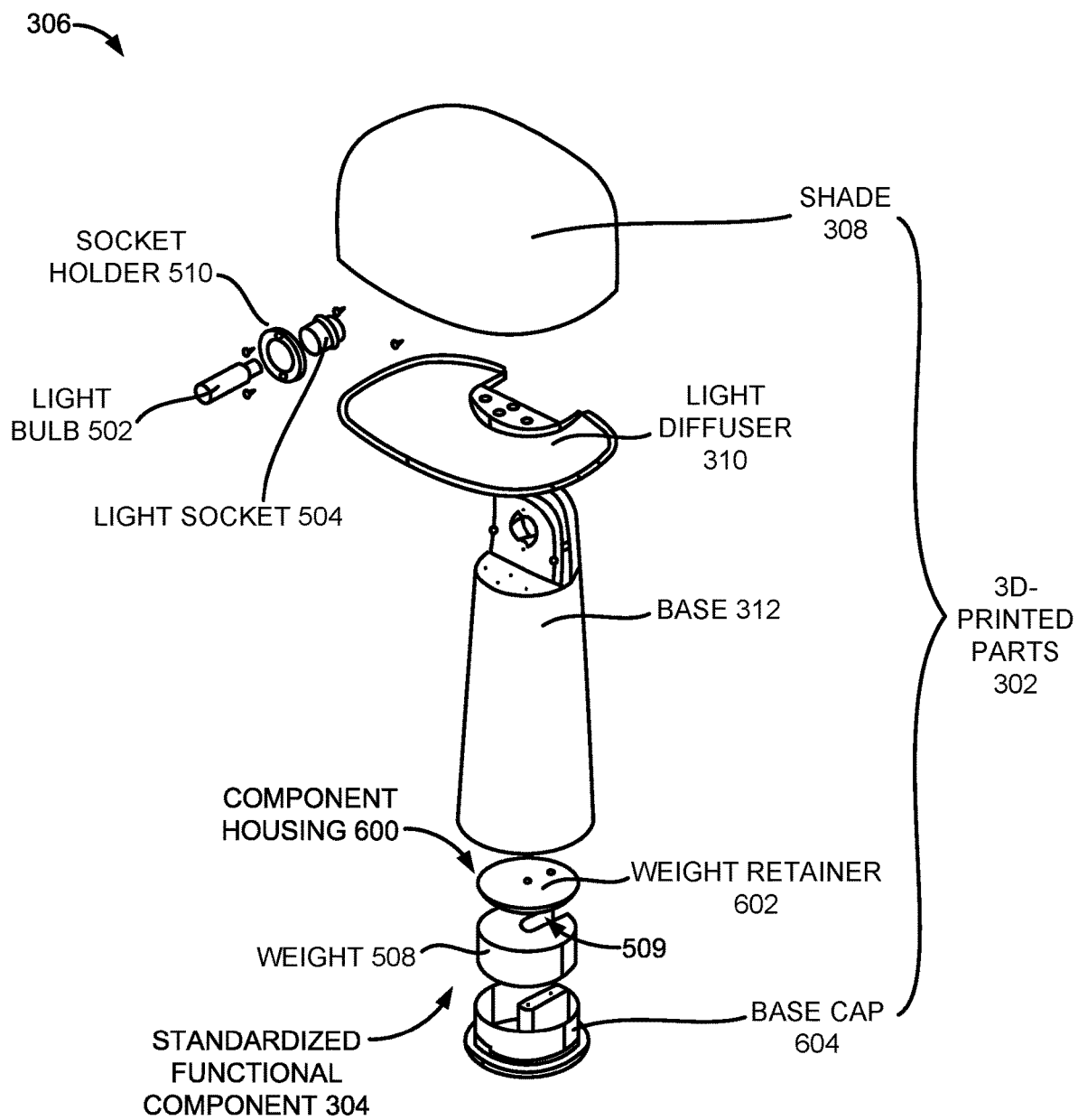
FIG. 6A illustrates an exploded view of one embodiment of a table light made using 3D-printed parts and pre-fabricated functional components.

FIG. 6A illustrates an exploded view of one embodiment of a table light 306 made using the methods and systems disclosed herein. As shown in FIG. 6A, the table light 306 can be made using a combination of 3D-printed parts 302 and standardized functional components 304. When the lighting product 300 is a table light 306, the 3D-printed parts 302 can comprise a table light shade 308, a table light diffuser 310, a table light base 312, a table light weight retainer 602, and a table light base cap 604.

In some embodiments, the table light shade 308, the table light base 312, the table light weight retainer 602, and the table light base cap 604 can be made of an opaque polymeric material. For example, these 3D-printed parts 302 can be printed using an opaque polymeric filament. As a more specific example, the opaque polymeric filament can be an opaque filament made of polylactic acid (PLA). In certain embodiments, the opaque PLA filament can be a plant-based PLA filament.

In these and other embodiments, the table light diffuser 310 can be made of a translucent polymeric material. For example, the table light diffuser 310 can be printed using a translucent polymeric filament. As a more specific example, the translucent polymeric filament can be a translucent filament made of PLA. In certain embodiments, the translucent PLA filament can be a plant-based clear PLA filament. In other embodiments, the translucent filament can be a translucent/clear PETG filament or translucent/clear PETT filament.

The table light diffuser 310 can be a 3D-printed cover or plate configured to engage with a base of the table light shade 308. The table light diffuser 310 can be made to diffuse light emitted by the light emitting component 502 housed, at least partially, within the table light shade 308.

When the lighting product 300 is a table light 306, the functional components 304 can comprise a light emitting component 502 (e.g., an E12 light bulb), a light socket 504 (e.g., an E12 light socket), a light socket holder 510 (an E12 socket holder), and a weight 508 (e.g., a 2 lbs. metal weight).

As shown in FIG. 6A, the light emitting component 502, the light socket 504, and the light socket holder 510 can be positioned, at least partially, within the table light shade 308. The table light diffuser 310 can mate with or otherwise couple to the table light shade 308 to form a contained housing for at least the light emitting component 502, the light socket 504, and the light socket holder 510. The table light base 312 can mate with or couple to the table light shade 308.

The table light base 312 can also serve as a housing for the weight 508 and the table light weight retainer 602. The table light base 312 can mate with or otherwise couple to the table light base cap 604 to enclose the weight 508 and the table light weight retainer 602. The table light weight retainer 602 can mate with or otherwise couple to at least part of the table light base cap 604 to retain the weight 508 or prevent the weight 508 from shifting within the table light base 312. The weight 508 (or weights 508) can rest along its bottom side when the table light 306 is upright. In other embodiments not shown in the figures, the weight 508 (or weights 508) can rest along its lateral side or surface when the table light 306 is upright.

FIG. 6A illustrates just one embodiment of a table light 306 made using 3D-printed parts 302 and standardized functional components 304. As shown in FIG. 3D, other embodiments of the table light 306 can also be made using other types of 3D-printed parts 302 and/or other functional components 304 (e.g., one or more rods 512 to extend the height of the table light shade 308 relative to the table light base 312). Moreover, other embodiments of the table light 306 can replace the opaque table light shade 308 with a translucent table light diffuser 310 (e.g., a spherical table light diffuser or a cylindrical table light diffuser) that partially encapsulates the light emitting component 502. In certain of these embodiments, the table light diffuser 310 can be mated with or otherwise coupled directly to the table light base 312.

As will be discussed in more detail in the following sections, the cloud computing server 202 can host an online repository of 3D CAD model files 702 of the standardized functional components 304. The 3D CAD model files 702 can be made available for download by the designer. The online repository can also comprise 3D CAD model files 702 of component housings 600 (see, e.g., FIGS. 6A and 6C) configured to house or support the standardized functional components 304. For example, the component housings 600 can refer to the table light weight retainer 602 and/or the table light base cap 604. The component housing 600 can also refer to the light socket holder 510.

The 3D CAD model files 702 can comprise 3D CAD models of the standardized functional components 304 and the component housings 600. The 3D CAD model files 702 can be provided as part of a starter kit made available for download by the designer. The designer can use the 3D CAD model files 702 of the standardized functional components 304 to determine the shapes and dimensions of the functional components 304. The designer can take into account the 3D CAD models of the necessary functional components 304 when designing the remainder of the lighting product 300. The designer can also integrate the 3D CAD models of the component housings 600 provided as part of the 3D CAD model files 702 into the 3D CAD models of the 3D-printed parts 302 designed by the designer. This is another way in which the methods and systems disclosed herein can be used by a designer to design a functional lighting product in less time than it would take to design a light from scratch.

Figure 6B:
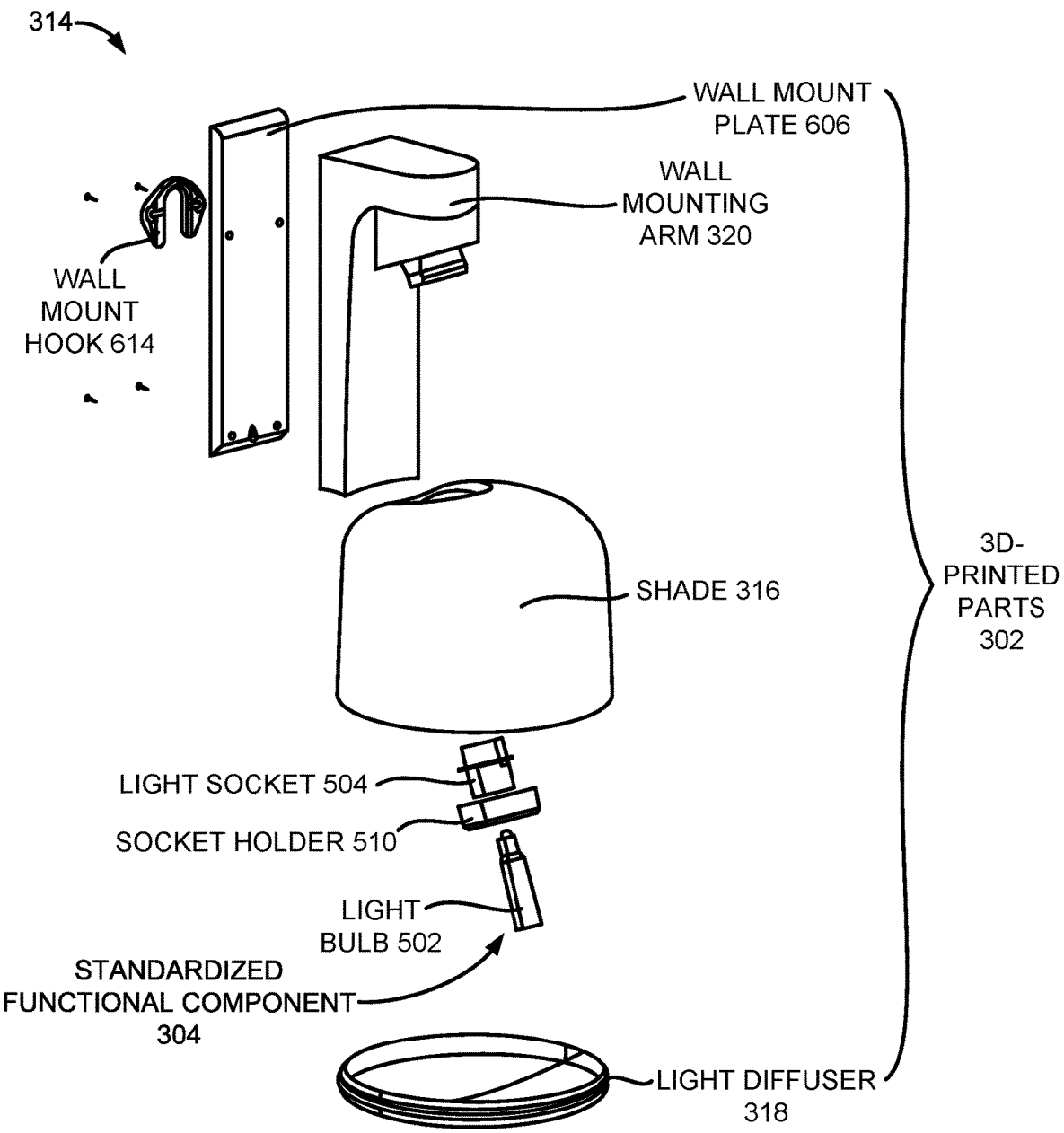
FIG. 6B illustrates an exploded view of one embodiment of a mountable wall light made using 3D-printed parts and pre-fabricated functional components.

FIG. 6B illustrates an exploded view of one embodiment of a mountable wall light 314 made using the methods and systems disclosed herein. As shown in FIG. 6B, the wall light 314 can be made using a combination of 3D-printed parts 302 and standardized functional components 304. When the lighting product is a wall light 314, the 3D-printed parts 302 can comprise a wall mount plate 606, a wall mounting arm 320, a wall light shade 316, and a wall light diffuser 318.

In some embodiments, the wall mount plate 606, the wall mounting arm 320, and the wall light shade 316 can be made of an opaque polymeric material. For example, these 3D-printed parts 302 can be printed using an opaque polymeric filament. As a more specific example, the opaque polymeric filament can be an opaque filament made of PLA. In certain embodiments, the opaque PLA filament can be a plant-based PLA filament.

In these and other embodiments, the wall light diffuser 318 can be made of a translucent polymeric material. For example, the wall light diffuser 318 can be printed using a translucent polymeric filament. As a more specific example, the translucent polymeric filament can be a translucent filament made of PLA. In certain embodiments, the translucent PLA filament can be a plant-based clear PLA filament. In other embodiments, the translucent filament can be a translucent/clear PETG filament or translucent/clear PETT filament.

The wall light diffuser 318 can be a 3D-printed cover or plate configured to engage with a base of the wall light shade 316. The wall light diffuser 318 can be made to diffuse light emitted by the light emitting component 502 housed, at least partially, within the wall light shade 316.

When the lighting product 300 is a wall light 314, the functional components 304 can comprise a light emitting component 502 (e.g., an E12 light bulb), a light socket 504 (e.g., an E12 light socket), a light socket holder 510 (an E12 socket holder), and a wall mount hook 614. The wall mount hook 614 can be configured to be affixed to a wall or surface using one or more securement screws and/or adhesives. The wall mount hook 614 can comprise a first mating feature configured to engage with a second mating feature on the wall mount plate 606.

In one example embodiment, the wall mount hook 614 can be or refer to the object mount disclosed in U.S. patent application Ser. No. 16/885,153 filed on May 27, 2020, the content of which is incorporated herein by reference in its entirety.

As shown in FIG. 6B, the light emitting component 502, the light socket 504, and the light socket holder 510 can be positioned, at least partially, within the wall light shade 316. The wall light diffuser 318 can mate with or otherwise couple to the wall light shade 316 to form a contained housing for at least the light emitting component 502, the light socket 504, and the light socket holder 510. For example, the wall light diffuser 318 can mate with the wall light shade 316 via a threaded mating feature or a press-fit mating feature.

The wall light shade 316 can also mate with or couple to a distal end of the wall mounting arm 320. The wall mounting arm 320 can be coupled to the wall mount plate 606 via screws or other types of fasteners. In other embodiments, the wall mounting arm 320 can be coupled to the wall mount plate 606 via a mating feature.

FIG. 6B illustrates just one embodiment of a wall light 314 made using 3D-printed parts 302 and several standardized functional components 304. As shown in FIG. 3D, other embodiments of the wall light 314 can also be made using other types of 3D-printed parts 302 and/or other functional components 304. Moreover, other embodiments of the wall light 314 can replace the opaque wall light shade 316 with a translucent wall light diffuser 318 (e.g., a spherical wall light diffuser or a cylindrical wall light diffuser) that partially encapsulates the light emitting component 502. In certain of these embodiments, the wall light diffuser 318 can be mated with or otherwise coupled directly to the wall mounting arm 320.

Figure 6C:
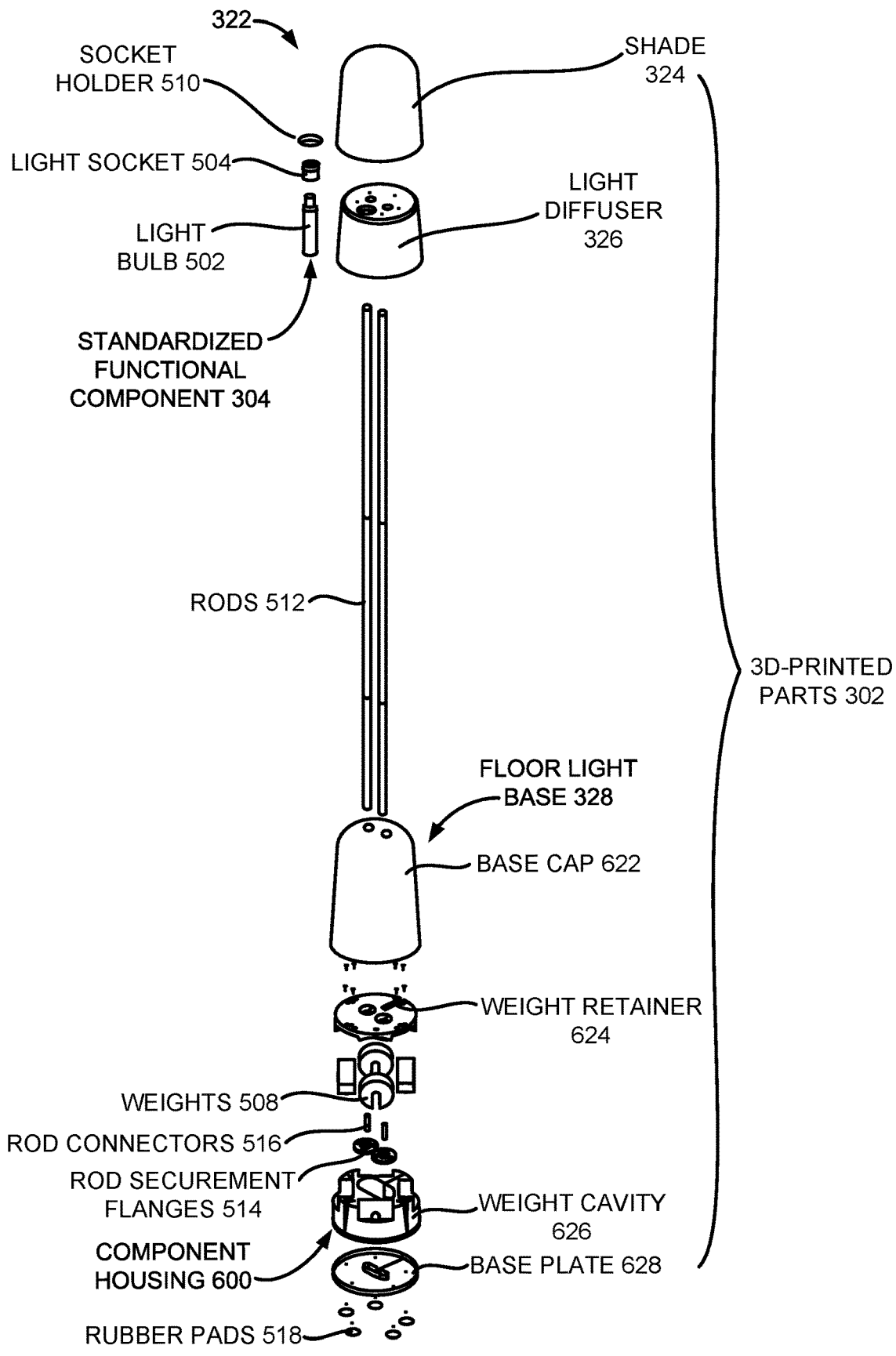
FIG. 6C illustrates an exploded view of one embodiment of a floor light made using 3D-printed parts and pre-fabricated functional components.

FIG. 6C illustrates an exploded view of one embodiment of a floor light 322 made using the methods and systems disclosed herein. As shown in FIG. 6C, the floor light 322 can be made using a combination of 3D-printed parts 302 and standardized functional components 304. When the lighting product 300 is a floor light 322, the 3D-printed parts 302 can comprise a floor light shade 324, a floor light diffuser 326, and a floor light base 328 comprising a floor light base cap 622, a floor light weight retainer 624, a floor light weight cavity 626, and a floor light base plate 628.

In some embodiments, the floor light shade 324, the floor light base cap 622, the floor light weight retainer 624, the floor light weight cavity 626, and the floor light base plate 628 can be made of an opaque polymeric material. For example, these 3D-printed parts 302 can be printed using an opaque polymeric filament. As a more specific example, the opaque polymeric filament can be an opaque filament made of PLA. In certain embodiments, the opaque PLA filament can be a plant-based PLA filament.

In these and other embodiments, the floor light diffuser 326 or light shield can be made of a translucent polymeric material. For example, the floor light diffuser 326 can be printed using a translucent polymeric filament. As a more specific example, the translucent polymeric filament can be a translucent filament made of PLA. In certain embodiments, the translucent PLA filament can be a plant-based clear PLA filament. In other embodiments, the translucent filament can be a translucent/clear PETG filament or translucent/clear PETT filament. The floor light diffuser 326 can be made to diffuse light emitted by the light emitting component 502.

When the lighting product 300 is a floor light 322, the functional components 304 can comprise a light emitting component 502 (e.g., an E26 light bulb), a light socket 504 (e.g., an E26 light socket), a light socket holder 510 (an E26 socket holder), one or more rods 512, a plurality of weights 508, a plurality of rod connectors 516, a plurality of rod securement flanges 514, and a plurality of rubber pads 518 configured to be affixed to a bottom exterior surface of the floor light base plate 628 to prevent the floor light base plate 628 from sliding.

The floor light weight retainer 624 can be mated or otherwise coupled to the floor light weight cavity 626 to retain the plurality of weights 508 used to stabilize or balance the floor light 322. For example, FIG. 6C illustrates four weights 508 being used to stabilize or balance the floor light 322. FIG. 6C also illustrates that the weights 508 can rest along their lateral sides or surfaces when the floor light 322 is upright. The floor light weight retainer 624, the plurality of weights 508, and the floor light weight cavity 626 can be housed within the floor light base cap 622.

The floor light base cap 622 can also house the rod connectors 516 and the rod securement flanges 514. The rod connectors 516 and the rod securement flanges 514 can work together to secure the rods 512 to the base of the floor light 322. The rod connectors 516 can also be used to connect rods 512 to one another to extend or raise the height of the floor light shade 324 relative to the floor light base cap 622.

As shown in FIG. 6C, the light emitting component 502, the light socket 504, and the light socket holder 510 can be positioned, at least partially, within the floor light shade 324 and the floor light diffuser 326 or light shield. The floor light diffuser 326 can mate with or otherwise be coupled to the floor light shade 324.

FIG. 6C illustrates just one embodiment of a floor light 322 made using 3D-printed parts 302 and several standardized functional components 304. As shown in FIG. 3D, other embodiments of the floor light 322 can also be made using other types of 3D-printed parts 302 and/or other functional components 304. Moreover, other embodiments of the floor light 322 can replace the opaque floor light shade 324 with a translucent floor light diffuser 326 (e.g., an ovoid wall light diffuser, a spherical wall light diffuser, or a cylindrical wall light diffuser) that partially encapsulates the light emitting component 502.

FIG. 7 illustrates one embodiment of a repository GUI 700 configured to be rendered through a web browser or software application (e.g., a mobile application or tablet application) running on the designer computing device 210. The repository GUI 700 can be used to access an online repository of 3D CAD model files 702 of the standardized functional components 304 and/or component housings 600. The repository GUI 700 can also be referred to as a download page.

The repository GUI 700 can be provided as part of a web-based portal or online workflow made accessible to the designer as part of the manufacturing process. For example, the repository GUI 700 can be configured to be displayed on the computing device 210 of the designer. In other embodiments, the repository GUI 700 can be configured to be displayed on a portable electronic device (e.g., a smartphone or tablet) used by the designer.

The designer can use the 3D CAD model files 702 of the standardized functional components 304 to determine the shapes and dimensions of the functional components 304 in order to design 3D-printed parts 302 that can accommodate such functional components 304. The designer can also integrate the 3D CAD models of the component housings 600 into the 3D CAD models of the 3D-printed parts 302 designed by the designer. For example, the designer can integrate a 3D CAD model of a weight cavity (a type of component housing 600) downloaded from the online repository into a 3D CAD model of a floor light base designed by the designer. This is another way in which the methods and systems disclosed herein can be used by a designer to design a functional lighting product in less time than it would take to design a light from scratch.

The cloud computing server 202 can host the online repository of 3D CAD model files 702. For example, the 3D CAD model files 702 can be stored in one or more databases (e.g., relational databases) accessible to the cloud computing server 202.

The cloud computing server 202 can generate the repository GUI 700 to be displayed on the designer computing device 210 or a portable electronic device of the designer in response to the cloud computing server 202 receiving the size selection concerning the lighting product size 414. For example, the designer can be shown the repository GUI 700 or download page when the designer makes a size selection concerning the lighting product size 414 by applying a user input to the size selection GUI 412.

In some embodiments, the 3D CAD model files 702 can be filtered or sorted such that only 3D CAD model files 702 of standardized functional components 304 corresponding to the lighting product category 402, the lighting product type 408, and/or the lighting product size 414 are shown to the designer via the repository GUI 700. In these embodiments, the designer can also adjust a filter functionality 704 (e.g., a filter drop-down menu) to show additional 3D CAD model files 702. For example, the cloud computing server 202 can generate the repository GUI 700 such that only 3D CAD model files 702 of functional components 304 that fit within a certain sized light selected by the designer are displayed and/or made available for download.

Moreover, the cloud computing server 202 can generate the repository GUI 700 such that 3D CAD model files 702 of all standardized functional components 304 needed by the lighting product 300 to operate functionally are presented or displayed to the designer as part of the repository GUI 700. For example, the designer can make a category selection, a light type selection, and a size selection to indicate that the designer desires to make a tall accent floor light. In this case, based on the designer's previous selections, the cloud computing server 202 can generate the repository GUI 700 such that 3D CAD model files 702 of all standardized functional components 304 needed to functionally operate a tall accent floor light are presented or displayed to the designer as part of the repository GUI 700.

One technical advantage of this particular step of the method is that a designer does not need to know how to functionally enable their design prior to the designer undertaking the manufacturing process. For example, the cloud computing server 202 only has to receive the designer's category selection, light type selection, and size selection and the cloud computing server 202 can automatically inform the designer what types of functional components 304 are needed to enable the lighting product 300 to operate functionally.

The repository GUI 700 can also comprise a search functionality 706 (e.g., a search bar) to allow the designer to search for 3D CAD model files 702 by name or to search for all 3D CAD model files 702 of a particular type of functional component 304.

The 3D CAD model files 702 can be downloaded to the computing device 210 of the designer when the designer applies a user input to a download link 708 or graphical icon. The designer can also sort the listing of 3D CAD model files 702 by name, type, creation date, or a combination thereof.

The 3D CAD model files 702 can be made available for download in a commonly available CAD file format. For example, the 3D CAD model files 702 can be made available for download as STEP files (e.g., .STEP or .STP files). In other embodiments, the 3D CAD model files 702 can be made available for download as SolidWorks® files (e.g., .SLDPRT files or .SLDASM files), AutoCAD® files or Fusion 360® files (e.g., .F3D files), IGES files (e.g., .IGS or .IGES files), or a combination thereof.

In some embodiments, the online repository can also comprise 3D CAD model files 702 of component housings 600 (see, e.g., FIGS. 6A and 6C) configured to house or support the standardized functional components 304. For example, the component housings 600 can refer to a weight retainer or cavity (e.g., the floor light weight retainer 624 or floor light weight cavity 626). In certain embodiments, the component housing 600 can also refer to the light socket holder 510.

The 3D CAD model files 702 of the component housings 600 can be provided or listed individually through the repository GUI 700 or provided as part of a starter kit such that the 3D CAD model file 702 includes both 3D CAD models of the standardized functional components 304 and the component housings 600.

FIG. 8A illustrates one embodiment of an assembly file upload GUI 800 allowing the designer to upload an assembly CAD model file 802 to the cloud computing server 202. The assembly CAD model file 802 can be stored in the cloud storage 204. The assembly CAD model file 802 can comprise a 3D CAD model of the entire lighting product 300 including all constituent parts.

The designer can upload the assembly CAD model file 802 after the designer has downloaded the 3D CAD model files 702 of the standardized functional components 304 and the component housings 600.

As previously discussed, the designer can integrate at least part of the 3D CAD models of the component housings 600 into an assembled model of the lighting product 300 in the assembly CAD model file 802 and at least one part model of a 3D-printed part 302 of the lighting product 300 in a part CAD model file 806.

The designer can upload the assembly CAD model file 802 by dragging and dropping the assembly CAD model file 802 onto a window or upload graphic displayed as part of the assembly file upload GUI 800. In other embodiments, the designer can upload the assembly CAD model file 802 by applying a user input to the window or upload graphic and selecting a filepath of the assembly CAD model file 802.

In some embodiments, the assembly CAD model file 802 uploaded can be in a commonly available CAD file format. For example, the assembly CAD model file 802 uploaded can be a STEP file (e.g., a .STEP or .STP file). In other embodiments, the assembly CAD model file 802 uploaded can be a .ASM file, a .SLDASM file, or a .IAM file.

FIG. 8B illustrates one embodiment of a part file upload GUI 804 allowing the designer to upload a plurality of part CAD model files 806 to the cloud computing server 202 or a cloud-based database or storage accessible to the cloud computing server 202. The part CAD model file 806 can comprise a 3D CAD model of a part or component of the lighting product 300.

In some embodiments, the part file upload GUI 804 can be displayed after the assembly file upload GUI 800. In other embodiments, the part file upload GUI 804 can be displayed before the assembly file upload GUI 800 such that the plurality of part CAD model files 806 can be uploaded before the assembly CAD model file 802.

The designer can upload a part CAD model file 806 by dragging and dropping the part CAD model file 806 onto a window or upload graphic displayed as part of the part file upload GUI 804. In other embodiments, the designer can upload a part CAD model file 806 by applying a user input to the window or upload graphic and selecting a filepath of the part CAD model file 806.

The cloud computing server 202 can receive the assembly CAD model file 802 and the plurality of part CAD model files 806 when the designer uploads them via the aforementioned upload GUIs using the designer computing device 210. In other embodiments, the cloud computing server 202 can be notified once the assembly CAD model file 802 and the plurality of part CAD model files 806 are received or stored in a cloud-based database or storage.

In some embodiments, the part CAD model file 806 uploaded can be in a common CAD file format. For example, the part CAD model file 806 uploaded can be a SolidWorks® part file (e.g., a .SLDASM file). In other embodiments, the part CAD model file 806 uploaded can be a STEP file (e.g., a .STEP or .STP file), a .PRT file, a Fusion 360® parts file (e.g., a .F3D file), or a .PAR file.

FIG. 8B also illustrates that a designer can select a desired material composition of the 3D-printed part 302 represented by the part CAD model file 806 via the part file upload GUI 804. For example, the designer can select a desired material composition of the 3D-printed part 302 by applying a user input (e.g., a touch input, a click input, etc.) to a material selection interface 808. In some embodiments, the material selection interface 808 can be a set of radio buttons associated with the various material choices. In other embodiments, the material selection interface 808 can be a drop-down menu or a clickable link. In further embodiments, the material selection interface 808 can be presented through a separate pop-up window after the designer uploads a part CAD model file 806.

As shown in FIG. 8B, the designer can select between an opaque material 810 or a translucent material 812. The opaque material 810 can be a 3D printing material having a darker or solid-colored hue. For example, by selecting the opaque material 810, that particular 3D-printed part 302 can be printed using an opaque polymeric filament. As a more specific example, by selecting the opaque material 810, that particular 3D-printed part 302 can be printed using an opaque PLA filament or other type of opaque 3D printing filament. Moreover, the opaque PLA filament can be a plant-based opaque PLA filament.

The translucent material 812 can be a clear or translucent 3D printing material. For example, by selecting the translucent material 812, that particular 3D-printed part 302 can be printed using a translucent polymeric filament. As a more specific example, by selecting the translucent material 812, that particular 3D-printed part 302 can be printed using a translucent PLA filament or other type of opaque 3D printing filament. Moreover, the translucent PLA filament can be a plant-based translucent PLA filament. In other embodiments, the translucent polymeric filament can be a translucent/clear PETG filament or a translucent/clear PETT filament.

Although opaque and translucent materials are discussed and shown in the figures, it is contemplated by this disclosure that additional materials can also be offered as options including materials made from different polymers (e.g., acrylonitrile butadiene styrene (ABS), polystyrene (PS), nylon, polyethylene terephthalate (PET), polyethylene terephthalate glycol (PETG), polycarbonate (PC), and/or polypropylene (PP)). In other embodiments, the designer can select to print the 3D-printed part 302 using a metal-infused material (e.g., copper, bronze, brass, or stainless steel infused 3D printing filament) and/or a wood-filled material (e.g., a PLA base material with wood dust, cork, or powdered wood derivatives infused into the base material).

Once the designer has selected a material, the cloud computing server 202 can associate the desired material with the particular 3D-printed part 302 represented by the uploaded part CAD model file 806. For example, the cloud computing server 202 can apply a tag with the name or other type of identifier of the desired material to the name or description of the 3D-printed part 302 or to the part CAD model file 806. During the 3D printing step of the manufacturing process, the 3D printer 208 can be automatically or manually spooled, fed, or supplied with the 3D printing filament selected by the designer when the 3D printer 208 begins to print that particular 3D-printed part 302.

FIG. 8C illustrates one embodiment of a color selection GUI 814 allowing the designer to select one or more paint colors 816 of the lighting product 300. The color selection GUI 814 can be configured to be rendered on a display of the designer computing device 210. The color selection GUI 814 can be presented to the designer once the designer has uploaded the assembly CAD model file 802 and all part CAD model files 806. The color selection GUI 814 can also be presented to the designer once the designer has selected the opaque material 810 as the material of a particular 3D-printed part 302.

In some embodiments, the designer can select a paint color 816 for the entire lighting product 300 such that all 3D-printed parts 302 designated as or assigned the opaque material 810 can be colored the same color. In these and other embodiments, the designer can select up to a certain number of paint colors (e.g., up to 3 colors) to color the entire lighting product 300.

In other embodiments, the designer can select a paint color 816 for each 3D-printed part 302 of the lighting product 300. For example, the designer can select "snow" or a white-color for a table light base 312 of a table light 306 and "forest" or a green-color for the table light shade 308 of the same table light 306.

The designer can select a color by applying a user input (e.g., a touch input, a click input, etc.) to a color selection graphic 818 or icon.

Once the designer has selected a paint color 816, the cloud computing server 202 can associate the desired color with a particular 3D-printed part 302 represented by the uploaded part CAD model file 806 or all opaque parts of the entire lighting product. For example, the cloud computing server 202 can apply a tag with the name or other type of identifier of the desired color to the name or description of the 3D-printed part 302, the part CAD model file 806, or the assembly CAD model file 802. During the finishing step of the manufacturing process, the 3D-printed parts 302 of the lighting product 300 can be painted with an industrial-grade paint sprayer or paint gun. The 3D-printed parts 302 can be painted using an acrylic-based paint, an oil-based paint, an enamel paint, a colored lacquer paint, or a combination thereof.

Figure 9A:
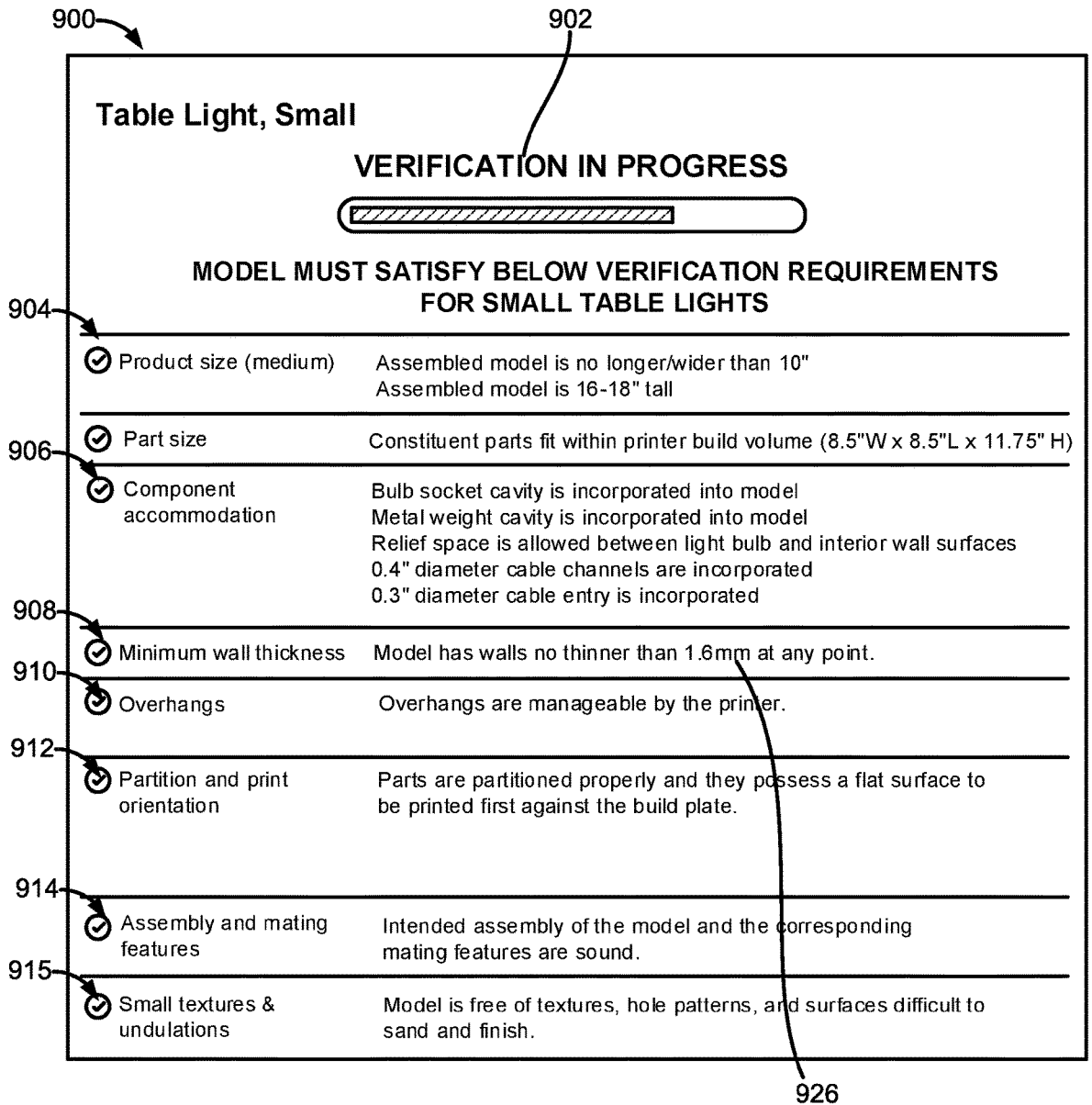
FIG. 9A illustrates one embodiment of a verification GUI showing the uploaded CAD model files being verified as part of the manufacturing process.

FIG. 9A illustrates one embodiment of a verification GUI 900 configured to be rendered through a web browser or software application (e.g., a mobile application) running on the designer computing device 210, a production computing device 206, or a combination thereof. The verification GUI 900 can show that a file verification process 902 is in progress. As part of the file verification process 902, the plurality of part CAD model files 806 and the assembly CAD model file 802 uploaded by the designer can be checked or reviewed to ensure that the 3D CAD models contained within the files meet certain verification requirements.

In some embodiments, the file verification process 902 can comprise a size verification process 904, a component accommodation verification process 906, a wall thickness verification process 908, an overhang verification process 910, a partition and print orientation verification process 912, an assembly and mating verification process 914, and prohibited texture and undulations verification process 915.

The size verification process 904 can comprise verifying that the 3D CAD model of the assembled lighting product 300 represented by the assembly CAD model file 802 meets the bounding dimensions 416 associated with the size selection made by the designer initially. For example, as part of the size verification process 904, a 3D CAD model of the assembled lighting product 300 contained within the assembly CAD model file 802 can be checked to ensure that a height of the assembled lighting product 300 is within a maximum height threshold dimension and a width of the assembled lighting product 300 is within a maximum width threshold dimension. Also, for example, the 3D CAD model of the assembled lighting product 300 can be checked to ensure that a base footprint width or depth of the assembled lighting product 300 exceeds a minimum base footprint width/depth threshold.

Figure 9B:
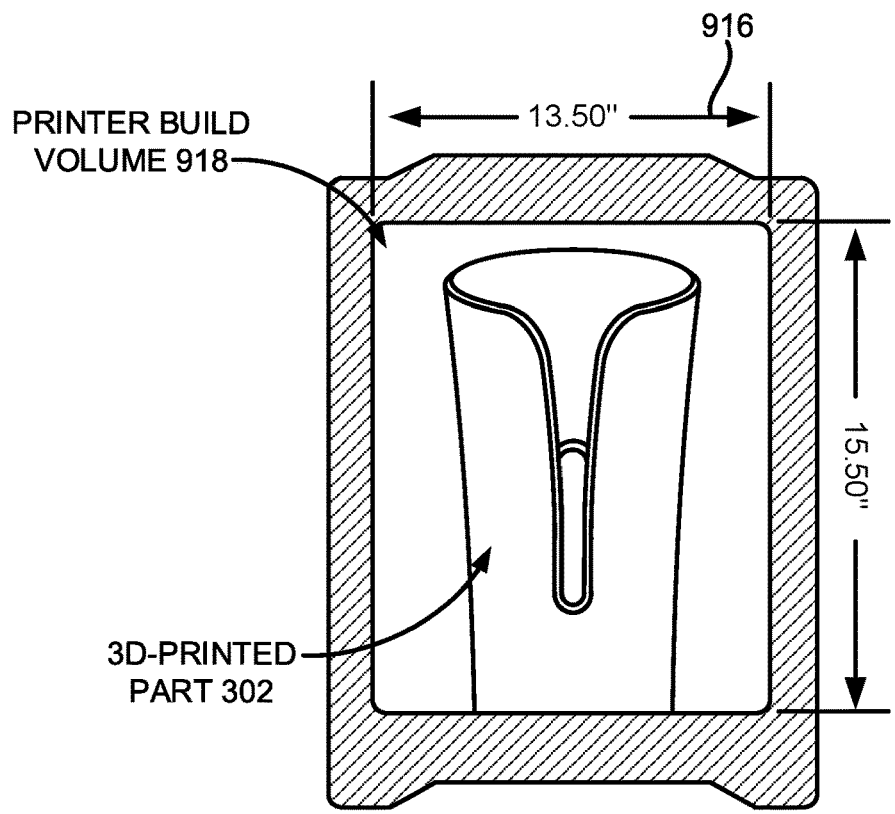
FIG. 9B illustrates an example of a part of the lighting product within a 3D printer.

The size verification process 904 can further comprise verifying that each constituent part of the lighting product 300 contained within a part CAD model file 806 meets certain constituent size requirements 916 (see, e.g., FIG. 9B). For example, as shown in FIG. 9B, the constituent size requirements 916 can be dictated by a printer build volume 918 of the 3D printer 208 used to print the constituent parts. The printer build volume 918 can be the maximum amount of space available within the confines of the 3D printer 208 to print the constituent part.

In some cases, the printer build volume 918 can be dictated by an area of the printbed or build plate and a height of the rails of the 3D printer 208 relative to the printbed/build plate. The printer build volume 918 can be comprised of a maximum build width, a maximum build length, and a maximum build height. As a more specific example, the size verification process 904 can comprise verifying that a part width of each constituent part is less than the maximum build width, a part length of each constituent part is less than the maximum build length, and a part height of each constituent part is less than the maximum build height.

In some embodiments, the size verification process 904 can be conducted automatically by at least one of the cloud computing server 202 and the production computing device 206. For example, at least one of the cloud computing server 202 and the production computing device 206 can run a software script (e.g., a C++ script, a Python script, etc.) to extract or parse out dimension data/values from the assembly CAD model file 802 and the plurality of part CAD model files 806. As a more specific example, at least one of the cloud computing server 202 and the production computing device 206 can run a software script to extract or parse out coordinates of vertices and edges of polygons or polyhedrons representing portions of the constituent parts of the lighting product 300. At least one of the cloud computing server 202 and the production computing device 206 can then calculate the dimensions using such coordinates.

In other embodiments, the size verification process 904 can be conducted semi-automatically such that certain steps of the size verification process 904 are conducted by at least one of the cloud computing server 202 and the production computing device 206 and certain steps of the size verification process 904 are conducted or double-checked by a production designer or manager using the production computing device 206. In further embodiments, the size verification process 904 can be conducted exclusively by the production designer or manager using the production computing device 206.

The size verification process 904 can also comprise applying a flag or tag to one or more of the plurality of part CAD model files 806 or the assembly CAD model file 802 if the 3D CAD models contained within such files do not meet the bounding dimensions 416 or the constituent size requirements 916. Moreover, the size verification process 904 can comprise notifying the designer through the verification GUI 900 or through another GUI or pop-up window that the 3D CAD models contained within at least one of the assembly CAD model file 802 and the plurality of part CAD model files 806 do not meet the bounding dimensions 416 or the constituent size requirements 916. The size verification process 904 can further comprise storing the dimension data or dimension values and using the dimension data or values as benchmarks or starting values when generating the set of optimized CAD model files 1004 as part of the file optimization process 1002 (see, e.g., FIG. 10A). For example, as part of the file optimization process 1002, the overall dimensions of the 3D CAD model of the lighting product 300 can be scaled down until the overall dimensions meet the bounding dimensions 416. Also, for example, one or more dimensions of the 3D CAD model of one or more constituent parts of the lighting product 300 can be increased or reduced until the dimensions meet the constituent size requirements 916.

The file verification process 902 can also comprise a component accommodation verification process 906. The component accommodation verification process 906 can comprise the step of verifying that the 3D CAD models of the lighting product 300 contained within the assembly CAD model file 802 and the plurality of part CAD model files 806 accommodate the standardized functional components 304. For example, as part of the component accommodation verification process 906, the plurality of part CAD model files 806 and the assembly CAD model file 802 can be checked to ensure that the 3D CAD models comprise cavities, interior spaces, or housings are of sufficient size to accommodate the standardized functional components 304. More specifically, the component accommodation verification process 906 can comprise checking the plurality of part CAD model files 806 and the assembly CAD model file 802 to ensure that the 3D CAD models of the lighting product 300 and its constituent parts comprise cavities, interior spaces, or housings that can accommodate the light socket 504 and the one or more weights 508 needed to stabilize or balance the lighting product 300.

Figure 9C:
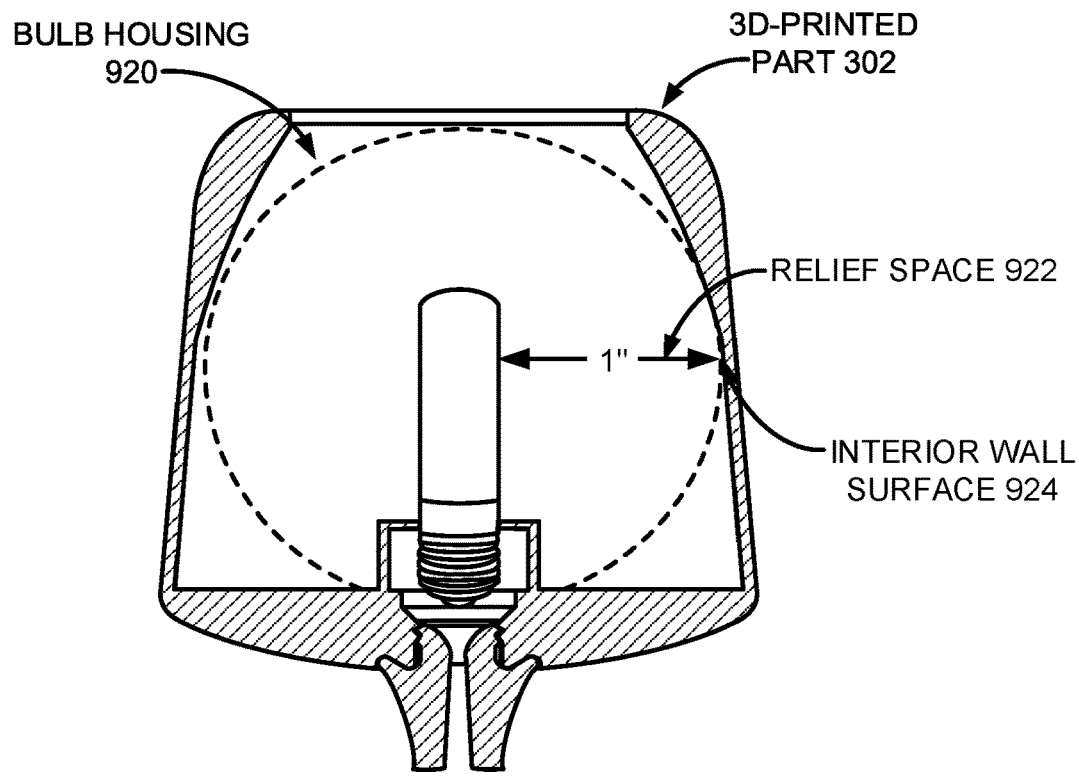
FIG. 9C illustrates an example of a relief space between a light emitting component (e.g., a light bulb) and a surface of the lighting product nearest to the light emitting component.

The component accommodation verification process 906 can comprise checking the plurality of part CAD model files 806 and the assembly CAD model file 802 to ensure that the 3D CAD model(s) of any parts (e.g., light shades or light diffusing elements/light diffusers) that comprise a part of a light emitting component housing 920 comprises a relief space 922 (see, e.g., FIG. 9C).

As shown in FIG. 9C, the relief space 922 can be a gap or void space separating an external surface of the light emitting component 502 from an interior wall surface 924 of the light emitting component housing 920. The relief space 922 can be predetermined and adjusted based on the lighting product size 414, the lighting product category 402, the lighting product type, or a combination thereof. For example, the relief space 922 can be approximately or at least 1.0 inch or 0.75 inches. The relief space 922 can be needed to prevent the light emitting component housing 920 from overheating or becoming too hot to the touch. The relief space 922 can also enhance light transmission.

The component accommodation verification process 906 can also comprise verifying that the 3D CAD models of the lighting product 300 contained within the assembly CAD model file 802 and the plurality of part CAD model files 806 comprise entry opening(s) and channel(s) or conduit(s) for cables or electrical cords connecting the light actuator 506 and the light socket 504. For example, as part of the component accommodation verification process 906, the 3D CAD models can be checked to ensure the entry opening(s) and channel(s) or conduit(s) meet certain minimum size (e.g., minimum diameter) requirements.

In certain embodiments, the component accommodation verification process 906 can comprise further verifying the channel(s) align with a weight cutout 509 of a weight 508 used to stabilize or balance the lighting product 300. This step can be done to ensure that the cables or electrical cords can pass through the weight 508 to reach the light socket 504.

In some embodiments, the component accommodation verification process 906 can be conducted automatically by at least one of the cloud computing server 202 and the production computing device 206. For example, at least one of the cloud computing server 202 and the production computing device 206 can run a software script (e.g., a C++ script, a Python script, etc.) to extract or parse out dimension data/values from the assembly CAD model file 802 and the plurality of part CAD model files 806 of all cavities or void spaces within the 3D CAD models. As a more specific example, at least one of the cloud computing server 202 and the production computing device 206 can run a software script to extract or parse out coordinates of vertices and edges of polygons or polyhedrons representing cavities or void spaces of the constituent parts of the lighting product 300. At least one of the cloud computing server 202 and the production computing device 206 can then calculate the cavity or spacing dimensions using such coordinates. These calculated dimensions can then be compared against the dimensions of the standardized functional components 304 provided to the designer as part of the downloadable 3D CAD model files 702 of the functional components 304 (e.g., the 3D CAD model files 702 made available for download through the online repository, see, e.g., FIG. 7). In addition, the calculated dimensions can also be compared against the dimensions of the 3D CAD models of the component housings 600 provided to the designer through the online repository.

In other embodiments, the component accommodation verification process 906 can be conducted semi-automatically such that certain steps of the component accommodation verification process 906 are conducted by at least one of the cloud computing server 202 and the production computing device 206 and certain steps of the component accommodation verification process 906 are conducted or double-checked by a production designer or manager using the production computing device 206. In further embodiments, the component accommodation verification process 906 can be conducted exclusively by the production designer or manager using the production computing device 206.

The component accommodation verification process 906 can also comprise applying a flag or tag to one or more of the plurality of part CAD model files 806 or the assembly CAD model file 802 if the 3D CAD models are determined to not be able to accommodate the necessary standardized functional components 304. Moreover, the component accommodation verification process 906 can comprise notifying the designer through the verification GUI 900 or through another GUI or pop-up window that the 3D CAD models contained within at least one of the assembly CAD model file 802 and the plurality of part CAD model files 806 are determined to not be able to accommodate the necessary standardized functional components 304. The component accommodation verification process 906 can further comprise storing the cavity dimension data or dimension values and using the cavity dimension data or values as benchmarks or starting values when generating the set of optimized CAD model files 1004 as part of the file optimization process 1002 (see, e.g., FIG. 10A). For example, as part of the file optimization process 1002, a relief space 922 can be added or increased, one or more cavities or housings can be added or the size of such cavities can be increased, a cable channel or entry opening can be added or the size of the channel or entry opening increased, or a combination thereof.

The file verification process 902 can also comprise a wall thickness verification process 908. The wall thickness verification process 908 can comprise the step of verifying that one or more walls of the 3D CAD models of the lighting product 300 contained within the assembly CAD model file 802 and the plurality of part CAD model files 806 exceed a minimum wall thickness 926. The minimum wall thickness 926 can vary based on various factors including a material used to print the parts of the lighting product 300. For example, the minimum wall thickness 926 can be approximately 1.6 mm when the 3D-printed parts 302 of the lighting product 300 are printed using a PLA-based polymeric material.

In some embodiments, a wall of a 3D-printed part 302 of the lighting product 300 can be comprised of two wall layers separated by a void space. At least part of the void space can be filled by a 3D printing material. In these embodiments, the minimum wall thickness 926 can refer to a total thickness of the wall including the thicknesses of the two wall layers and the void space. In these and other embodiments, each of the wall layers can also have a minimum thickness (e.g., a minimum thickness of at least 0.2 mm).

In some embodiments, the wall thickness verification process 908 can be conducted automatically by at least one of the cloud computing server 202 and the production computing device 206. For example, at least one of the cloud computing server 202 and the production computing device 206 can run a software script (e.g., a C++ script, a Python script, etc.) to extract or parse out dimension data/values from the assembly CAD model file 802 and the plurality of part CAD model files 806 of all wall thicknesses (including the thicknesses of all wall layers or void spaces). As a more specific example, at least one of the cloud computing server 202 and the production computing device 206 can run a software script to extract or parse out coordinates of vertices and edges of polygons or polyhedrons representing walls of the constituent parts of the lighting product 300 and/or void spaces between such walls. At least one of the cloud computing server 202 and the production computing device 206 can then calculate the wall thickness dimensions based on such coordinates. These calculated dimensions can then be compared against the minimum wall thickness 926. In some embodiments, the designer can be informed of the minimum wall thickness 926 when the designer downloads the 3D CAD model files 702 of the functional components 304.

In other embodiments, the wall thickness verification process 908 can be conducted semi-automatically such that certain steps of the wall thickness verification process 908 are conducted by at least one of the cloud computing server 202 and the production computing device 206 and certain steps of the wall thickness verification process 908 are conducted or double-checked by a production designer or manager using the production computing device 206. In further embodiments, the wall thickness verification process 908 can be conducted exclusively by the production designer or manager using the production computing device 206.

The wall thickness verification process 908 can also comprise applying a flag or tag to one or more of the plurality of part CAD model files 806 or the assembly CAD model file 802 if the wall thicknesses do not exceed the minimum wall thickness 926. Moreover, the wall thickness verification process 908 can comprise notifying the designer through the verification GUI 900 or through another GUI or pop-up window that the wall thicknesses do not exceed the minimum wall thickness 926.

The file verification process 902 can also comprise an overhang verification process 910. The overhang verification process 910 can comprise the step of verifying that all model overhang angles 1020 formed by overhangs 1018 (see, e.g., FIG. 10B) contained within the 3D CAD models of the lighting product 300 in the assembly CAD model file 802 and the plurality of part CAD model files 806 exceed a maximum overhang angle 1022 (see, e.g., FIG. 10C). The model overhang angle 1020 and the maximum overhang angle 1022 can both be measured with respect to a vertical orientation line 1024 or plane (see, e.g., FIG. 10C).

The overhang verification process 910 can be performed because certain laterally-extending overhangs can be difficult for 3D printers 208 to print without causing the extruded material to drip downward and adversely affect the print job.

The maximum overhang angle 1022 can vary based on various factors including the material used to print the parts of the lighting product 300. For example, the maximum overhang angle 1022 can be approximately 30 degrees as measured from the vertical orientation line 1024 or plane when the 3D-printed parts 302 of the lighting product 300 are printed using a PLA-based polymeric material. The vertical orientation line 1024 or plane can extend orthogonally from a flat or substantially flat surface of the 3D-printed part 302 in contact with a printbed or build plate of the 3D printer 208. The vertical orientation line 1024 can have a length dimension dictated by a vertical height of the overhang portion as measured from a start of the overhang portion.

In some embodiments, the overhang verification process 910 can be conducted automatically by at least one of the cloud computing server 202 and the production computing device 206. For example, at least one of the cloud computing server 202 and the production computing device 206 can run a software script (e.g., a C++ script, a Python script, etc.) to extract or parse out dimension data/values from the assembly CAD model file 802 and the plurality of part CAD model files 806 of all sides and exterior surfaces of the lighting product 300 and its constituent parts. At least one of the cloud computing server 202 and the production computing device 206 can then determine the model overhang angle 1020 using trigonometric functions such as cosine or sine. As a more specific example, the following function can be manipulated to determine the model overhang angle 1020: cos(Model Overhang Angle)=Vertical Orientation Line Length/Overhang Length. The model overhang angle 1020 can then be compared against the maximum overhang angle 1022. In some embodiments, the designer can be informed of the maximum overhang angle 1022 when the designer downloads the 3D CAD model files 702 of the functional components 304.

In other embodiments, the overhang verification process 910 can be conducted semi-automatically such that certain steps of the overhang verification process 910 are conducted by at least one of the cloud computing server 202 and the production computing device 206 and certain steps of the overhang verification process 910 are conducted or double-checked by a production designer or manager using the production computing device 206. In further embodiments, the overhang verification process 910 can be conducted exclusively by the production designer or manager using the production computing device 206.

The overhang verification process 910 can also comprise applying a flag or tag to one or more of the plurality of part CAD model files 806 or the assembly CAD model file 802 if a model overhang angle 1020 is discovered to exceed the maximum overhang angle 1022. Moreover, the overhang verification process 910 can comprise notifying the designer through the verification GUI 900 or through another GUI or pop-up window that a model overhang angle 1020 is discovered to exceed the maximum overhang angle 1022.

The file verification process 902 can also comprise a partition and print orientation verification process 912. The partition and print orientation verification process 912 can comprise verifying that the 3D CAD models of the constituent parts of the lighting product 300 contained within the plurality of part CAD model files 806 comprise at least one flat or substantially flat surface for contacting the printbed or build plate and that the constituent parts making up the lighting product 300 are partitioned appropriately such that all parts can be 3D printed without requiring undue support. Moreover, the partition and print orientation verification process 912 can also comprise verifying that the parts are partitioned in a way that makes sense with respect to the material selections made by the designer concerning such parts.

Moreover, although the partition and print orientation verification process 912 is referred to herein as being a one step process, it is contemplated by this disclosure that verifying the print orientation can be separated from verifying how the parts are partitioned. Moreover, it is contemplated by this disclosure that verifying how the parts are partitioned can be combined with other steps such as the assembly and mating verification process 914.

In some embodiments, the partition and print orientation verification process 912 can be conducted automatically by at least one of the cloud computing server 202 and the production computing device 206. For example, at least one of the cloud computing server 202 and the production computing device 206 can run a software script (e.g., a C++ script, a Python script, etc.) to extract or parse out coordinates of vertices and edges of polygons or polyhedrons representing the exterior surfaces of the constituent parts of the lighting product 300. As a more specific example, at least one of the cloud computing server 202 and the production computing device 206 can determine whether each of the constituent parts comprises at least one exterior surface comprising a flat or substantially flat area or region that can serve as the contact surface with the printbed or build plate such that the part can be 3D printed without tipping or falling over.

In other embodiments, the partition and print orientation verification process 912 can be conducted semi-automatically such that certain steps of the partition and print orientation verification process 912 are conducted by at least one of the cloud computing server 202 and the production computing device 206 and certain steps of the partition and print orientation verification process 912 are conducted or double-checked by a production designer or manager using the production computing device 206. In further embodiments, the partition and print orientation verification process 912 can be conducted exclusively by the production designer or manager using the production computing device 206.

The partition and print orientation verification process 912 can also comprise applying a flag or tag to one or more of the plurality of part CAD model files 806 if the at least one flat surface or area is not found. Moreover, the partition and print orientation verification process 912 can comprise notifying the designer through the verification GUI 900 or through another GUI or pop-up window that the 3D CAD model is missing at least one flat surface or area that can be used to contact the printbed or build plate.

The file verification process 902 can also comprise an assembly and mating verification process 914. The assembly and mating verification process 914 can comprise verifying that each of the 3D CAD models of the constituent parts of the lighting product 300 comprises a mating feature 1030 (see, e.g., FIG. 10G) and that the mating feature 1030 can mate or otherwise engage with a corresponding mating feature on a neighboring part.

In some embodiments, the assembly and mating verification process 914 can be conducted automatically by at least one of the cloud computing server 202 and the production computing device 206. For example, at least one of the cloud computing server 202 and the production computing device 206 can run a software script (e.g., a C++ script, a Python script, etc.) to extract or parse out coordinates of vertices and edges of shapes (e.g., polygons or polyhedrons) or contours representing portions of potential mating features from the plurality of part CAD model files 806 and the assembly CAD model file 802. At least one of the cloud computing server 202 and the production computing device 206 can then compare the shapes and contours extracted or detected against those of known mating features.

In some embodiments, 3D CAD model files 702 of common mating features can be made available for download by the designer through the online repository. In these embodiments, the at least one of the cloud computing server 202 and the production computing device 206 would only have to compare the coordinates, dimensions, and shapes extracted or parsed out from the plurality of part CAD model files 806 and the assembly CAD model file 802 with the coordinates, dimensions, and shapes of the mating features provided as part of the downloadable 3D CAD model files 702.

In other embodiments, the assembly and mating verification process 914 can be conducted semi-automatically such that certain steps of the assembly and mating verification process 914 are conducted by at least one of the cloud computing server 202 and the production computing device 206 and certain steps of the assembly and mating verification process 914 are conducted or double-checked by a production designer or manager using the production computing device 206. In further embodiments, the assembly and mating verification process 914 can be conducted exclusively by the production designer or manager using the production computing device 206.

The assembly and mating verification process 914 can also comprise applying a flag or tag to one or more of the plurality of part CAD model files 806 or the assembly CAD model file 802 if a mating feature 1030 is missing from such files or no mating features 1030 are detected within such files. Moreover, the assembly and mating verification process 914 can comprise notifying the designer through the verification GUI 900 or through another GUI or pop-up window that no mating feature 1030 is found or mating features 1030 are missing.

The file verification process 902 can also comprise a prohibited texture and undulations verification process 915. The prohibited texture and undulations verification process 915 can comprise verifying that the 3D CAD models of the lighting product 300 contained within the assembly CAD model file 802 and the plurality of part CAD model files 806 do not incorporate or comprise prohibited textures or surface undulations. The prohibited textures or surface undulations can be certain surface patterns (including undulations) and textures that are difficult to print using the 3D printers 208 or would make the 3D-printed part 302 difficult to sand/deburr, prime, or paint.

In some embodiments, the prohibited texture and undulations verification process 915 can be conducted automatically by at least one of the cloud computing server 202 and the production computing device 206. For example, at least one of the cloud computing server 202 and the production computing device 206 can run a software script (e.g., a C++ script, a Python script, etc.) to extract or parse out dimension data/values from the assembly CAD model file 802 and the plurality of part CAD model files 806 of all exterior surface contours or outlines. As a more specific example, at least one of the cloud computing server 202 and the production computing device 206 can run a software script to extract or parse out coordinates of shapes or lines representing such surface contours or outlines. At least one of the cloud computing server 202 and the production computing device 206 can then determine whether such surface contours or outlines comprise repeating shapes or patterns. These shapes or patterns can then be compared against prohibited shapes or patterns representing prohibited surface textures or undulations. In some embodiments, the designer can be informed of the prohibited surface textures and undulations when the designer downloads the 3D CAD model files 702 of the functional components 304.

In other embodiments, the prohibited texture and undulations verification process 915 can be conducted semi-automatically such that certain steps of the prohibited texture and undulations verification process 915 are conducted by at least one of the cloud computing server 202 and the production computing device 206 and certain steps of the prohibited texture and undulations verification process 915 are conducted or double-checked by a production designer or manager using the production computing device 206. In further embodiments, the prohibited texture and undulations verification process 915 can be conducted exclusively by the production designer or manager using the production computing device 206.

The prohibited texture and undulations verification process 915 can also comprise applying a flag or tag to one or more of the plurality of part CAD model files 806 or the assembly CAD model file 802 when the prohibited surface textures or undulations are detected. Moreover, the prohibited texture and undulations verification process 915 can comprise notifying the designer through the verification GUI 900 or through another GUI or pop-up window that certain prohibited surface textures or undulations are detected.

Figure 10A:
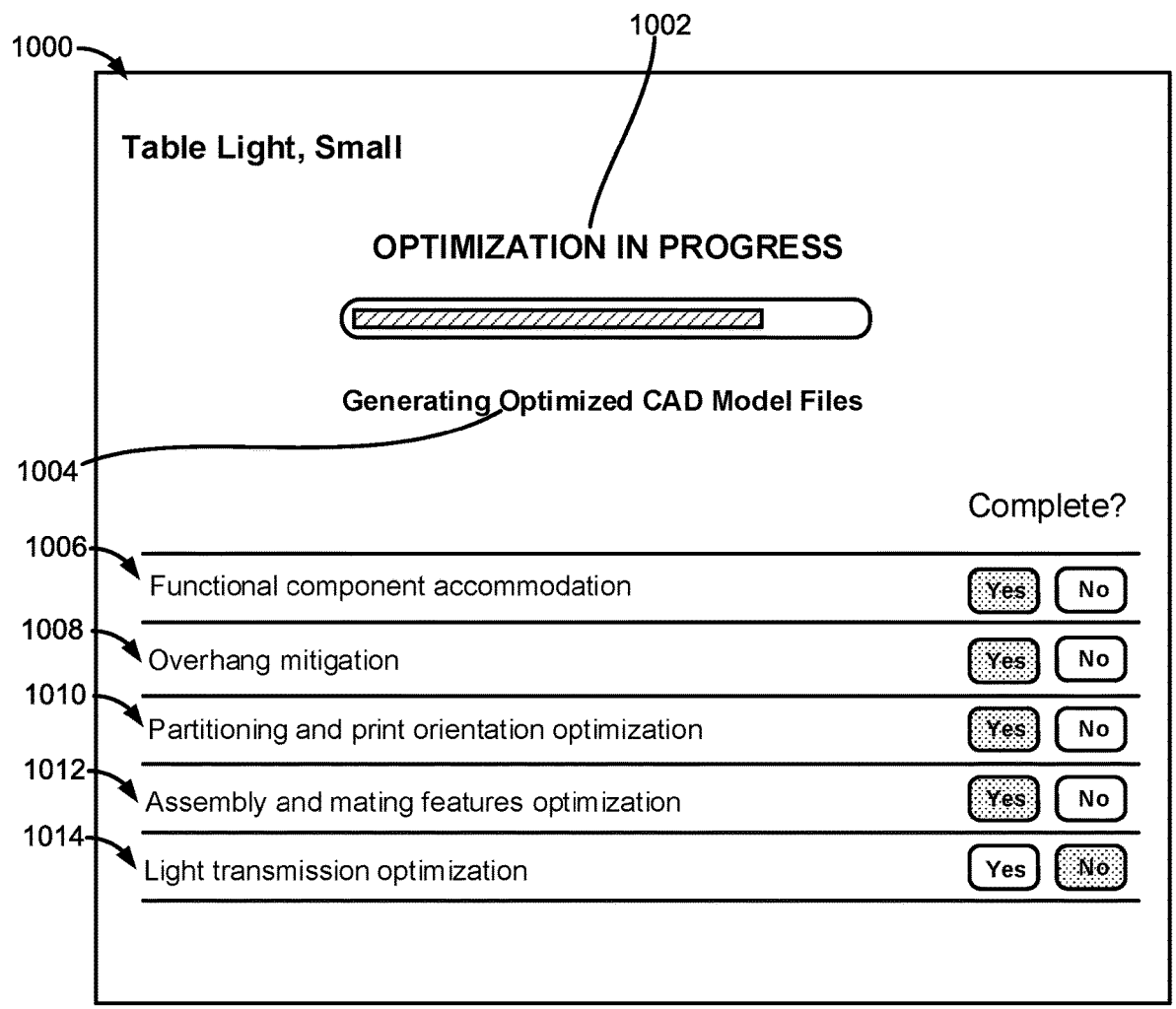
FIG. 10A illustrates one embodiment of an optimization GUI showing a file optimization process in progress.

FIG. 10A illustrates one embodiment of an optimization GUI 1000 configured to be rendered through a web browser or software application (e.g., a mobile application) running on the designer computing device 210, a production computing device 206, or a combination thereof. The optimization GUI 1000 can show that a file optimization process 1002 is in progress.

As part of the file optimization process 1002, the cloud computing server 202, the production computing device 206, or a combination thereof can generate a set of optimized CAD model files 1004 based on the assembly CAD model file and the plurality of part CAD model files uploaded by the designer. For example, the set of optimized CAD model files 1004 can comprise an optimized assembly CAD model file and at least one optimized part CAD model file.

In some embodiments, the optimized assembly CAD model file can be an updated or revised instance of the assembly CAD model file uploaded by the designer and the at least one optimized part CAD model file can be an updated or revised instance of at least one of the part CAD model files uploaded by the designer. As part of the file optimization process 1002, any problems or issues uncovered from the file verification process 902 can be addressed or fixed in the set of optimized CAD model files 1004 including the optimized assembly CAD model file and the at least one optimized part CAD model file.

In some embodiments, the set of optimized CAD model files 1004 can be generated or created by a production designer or manager using the production computing device 206 based on data or information obtained from the file verification process 902. For example, the set of optimized CAD model files 1004 can be generated or created by the production designer or manager using the production computing device 206 based on dimension values, flags, or tags obtained from the file verification process 902.

In other embodiments, the set of optimized CAD model files 1004 can be generated semi-automatically where certain steps of the file optimization process 1002 are conducted automatically by at least one of the cloud computing server 202 and the production computing device 206 using inputs obtained from the file verification process 902 and certain steps of the file optimization process 1002 are conducted or double-checked by a production designer or manager.

In additional embodiments, the set of optimized CAD model files 1004 can be generated automatically by at least one of the cloud computing server 202 and the production computing device 206. For example, at least one of the cloud computing server 202 and the production computing device 206 can run a software script (e.g., a C++ script, a Python script, etc.) to generate the set of optimized CAD model files 1004 using inputs obtained from the file verification process 902.

The file optimization process 1002 can comprise a functional component accommodation process 1006, an overhang mitigation process 1008, a partitioning and print orientation optimization process 1010, an assembly and mating feature optimization process 1012, and a light transmission optimization process 1014. In certain embodiments, the aforementioned steps of the file optimization process 1002 can refer to steps undertaken as part of the file generation or creation process when generating or creating the set of optimized CAD model files 1004.

As previously discussed, the file verification process 902 can determine that the 3D CAD models of the lighting product 300 contained within the assembly CAD model file 802 and the plurality of part CAD model files 806 did not include an accommodation for at least one standardized functional component 304 needed to enable the lighting product 300 to operate functionally. In this case, the functional component accommodation process 1006 can correct or mitigate any issues concerning the lack of accommodations for the standardized functional component 304. For example, as part of the functional component accommodation process, one or more cavities or component housings 600 can be added or the size of such cavities or housings can be increased. Also, for example, as part of the functional component accommodation process, one or more cable or cord channels or entry openings can be added and/or the size of such channels or entry openings can be increased. Moreover, as part of the functional component accommodation process, a relief space 922 can be added separating the light emitting component 502 from the nearest interior side wall or surface or the size of the relief space 922 can be increased.

Moreover, the file optimization process 1002 can comprise the step of mitigating any overhang issues (referred to herein as the overhang mitigation process 1008) associated with the 3D CAD models contained within the CAD files uploaded by the designer. As previously discussed, the file verification process 902 can determine that at least one model overhang angle 1020 of a 3D CAD model uploaded by the designer does not exceed a maximum overhang angle 1022 (see, e.g., FIGS. 10B and 10C).

For example, FIG. 10B illustrates one embodiment of a 3D-printed part 302 with an overhang 1018 that can be difficult or challenging to print. An overhang 1018 can be defined as a portion of a 3D-printed structure that projects out or extends out in a lateral direction from an adjoining portion immediately below. As shown in FIG. 10B, the model overhang angle 1020 can be approximately 90 degrees when the 3D-printed part 302 in FIG. 10B is designed to be printed with the vertical portion first. As depicted in FIG. 10B, this model overhang angle 1020 can greatly exceed a maximum overhang angle 1022 (e.g., 30 degrees). When the printhead begins to print this overhang 1018, the material extruded from the printhead can drip downward and adversely affect the print job.

FIG. 10C illustrates that, in some embodiments, both the model overhang angle 1020 and the maximum overhang angle 1022 can be measured with respect to a vertical orientation line 1024 or plane. The maximum overhang angle 1022 can vary based on various factors including the material used to print the parts of the lighting product 300. For example, the maximum overhang angle 1022 can be approximately 30 degrees as measured from the vertical orientation line 1024 or plane when the 3D-printed parts 302 of the lighting product 300 are printed using a PLA-based polymeric material. The vertical orientation line 1024 or plane can extend orthogonally from a flat or substantially flat surface of the 3D-printed part 302 in contact with a printbed or build plate of the 3D printer 208.

In some embodiments, the overhang mitigation process 1008 can comprise reducing one or more model overhang angles 1020 of the 3D CAD models until all such angles are less than the maximum overhang angle 1022. In other embodiments, the overhang mitigation process 1008 can comprise deleting or replacing one or more overhangs 1018 of the 3D CAD models with other structural features that are less difficult to print.

FIG. 10D illustrates that the overhang mitigation process 1008 can also comprise changing a print orientation of a 3D-printed part 302 by flipping the 3D-printed part 302 180 degrees and printing the difficult to print portion (e.g., what used to be the overhang portion) first.

In some embodiments, the overhang mitigation process 1008 can comprise incorporating such changes in new 3D CAD models generated or created as part of the set of optimized CAD model files 1004. In other embodiments, the overhang mitigation process 1008 can comprise changing or revising the G-Code instructions once the set of optimized CAD model files 1004 are converted into G-Code.

The file optimization process 1002 can further comprise a partitioning and print orientation optimization process 1010. The partitioning and print orientation optimization process 1010 can comprise partitioning or dividing up a singular constituent part of the lighting product 300 into multiple parts.

For example, FIG. 10E illustrates one example of partitioning a part of the lighting product 300 to allow the part to fit within a printer build volume 918 of the 3D printer 208. As previously discussed, the file verification process 902 can reveal that at least one of the constituent parts of the lighting product 300 does not meet certain constituent size requirements 916 (e.g., a height of the part is greater than a maximum build height dictated by the printer build volume 918). The partitioning step can comprise dividing the part into multiple partitioned parts 1026 using a 3D CAD program. The partitioning step can also comprise generating or creating new 3D CAD models of the partitioned parts 1026. The partitioning step can also comprise saving the new 3D CAD models as new part CAD model files to be included as part of the set of optimized CAD model files 1004.

In some embodiments, the part is divided such that the resulting smaller parts are of equal size. In other embodiments, the part is divided such that as much of the former part is retained together that meets (but does not exceed) maximum size requirements and the remainder of the part is partitioned out.

The partitioning and print orientation optimization process 1010 can further comprise changing a print orientation 1028 of a constituent part to improve a printability of the part. For example, changing the print orientation 1028 of a part can comprise rotating the part until another flat or substantially flat surface of the rotated part can act as a contact surface for contacting the printbed or build plate of the 3D printer 208. For example, changing the print orientation 1028 can comprise rotating a part 30 degrees, 45 degrees, 90 degrees, 120 degrees, or 180 degrees.

Moreover, the partitioning and print orientation optimization process 1010 can also comprise partitioning a singular part into multiple partitioned parts 1026 and changing the print orientation 1028 of one of the partitioned parts 1026 to improve a printability of the partitioned part 1026. For example, FIG. 10F illustrates one part of a lighting product 300 divided into two partitioned parts 1026 with one of the partitioned parts 1026 having an overhang 1018 if printed in its current orientation. As part of the partitioning and print orientation optimization process 1010, the partitioned part 1026 having the overhang 1018 can have its print orientation 1028 changed (e.g., by being rotated 180 degrees) such that there is no longer an overhang 1018.

As such, partitioning a part into multiple partitioned parts 1026 and changing a print orientation 1028 of at least one of the partitioned parts 1026 can also be considered part of the overhang mitigation process 1008. Moreover, although the partitioning step is discussed in conjunction with changing the print orientation of a part, it should be understood by one of ordinary skill in the art that such steps can be separate file optimization processes or steps.

The file optimization process 1002 can also comprise an assembly and mating feature optimization process 1012. The assembly and mating feature optimization process 1012 can take as inputs the results of the assembly and mating verification process 914. For example, the assembly and mating verification process 914 can reveal that no mating features 1030 are detected within a 3D CAD model of a part or mating features 1030 on adjoining parts are not complementary. In these cases, the assembly and mating feature optimization process 1012 can comprise generating or creating new 3D CAD models of such parts with the missing mating feature 1030 added or a non-complementary mating feature 1030 changed to a complementary mating feature 1030. The assembly and mating feature optimization process 1012 can further comprise saving the new 3D CAD models as new part CAD model files to be included as part of the set of optimized CAD model files 1004.

Figure 10G:
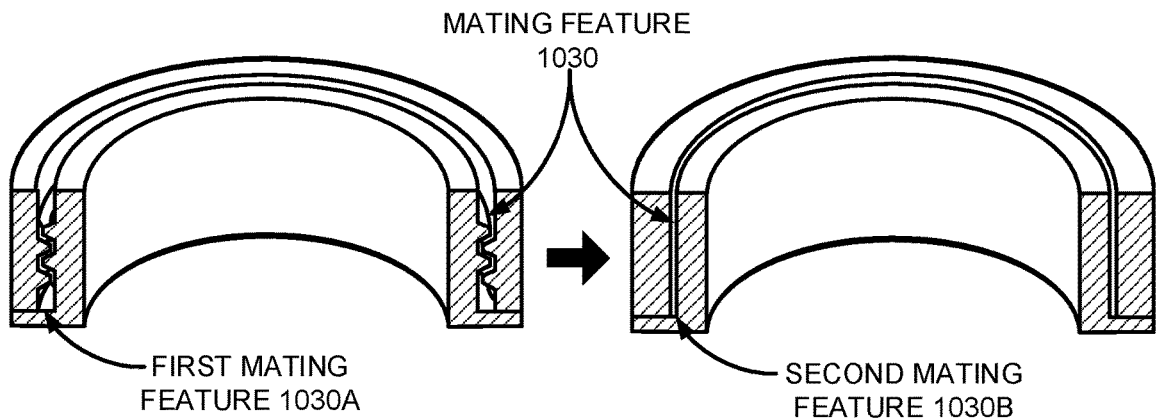
FIG. 10G illustrates a threaded mating feature that can be turned into a press-fit mating feature to ease an assembly of a lighting product.

FIG. 10G also illustrates that the assembly and mating feature optimization process 1012 can further comprise changing a first mating feature 1030A detected from the file verification process 902 to a second mating feature 1030B to reduce an overall assembly time of the lighting product 300. For example, FIG. 10G illustrates changing a threaded-mating feature (e.g., a threaded screw-type interface) to a press-fit mating feature.

Figure 10H:
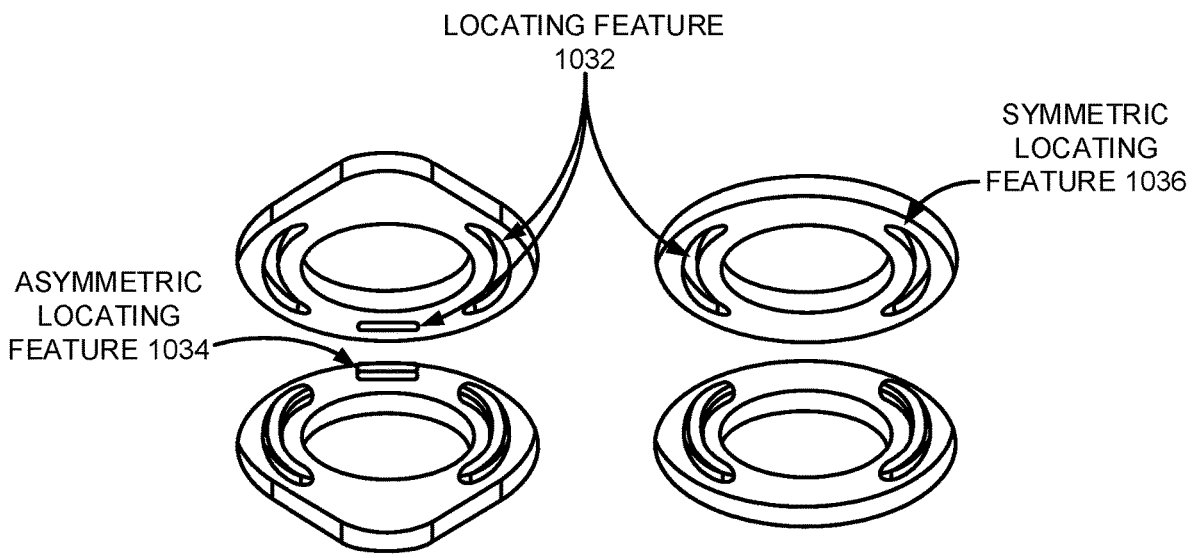
FIG. 10H illustrates examples of symmetric and asymmetric locating features that can be used to ease an assembly of a lighting product.

FIG. 10H illustrates that the assembly and mating feature optimization process 1012 can also comprise adding one or more locating features 1032 to one or more interfaces between two adjoining parts to better inform an assembler of the lighting product 300 how the parts of the lighting product 300 should be assembled. Adding the locating features 1032 can also reduce an overall assembly time of the lighting product 300 by making the assembly of the lighting product 300 more intuitive. The locating feature 1032 can comprise an asymmetric locating feature 1034, a symmetric locating feature 1036, or a combination thereof.

The assembly and mating feature optimization process 1012 can further comprise generating or creating new 3D CAD models of parts with new or changed mating features 1030 and/or new or changed locating features 1032. The assembly and mating feature optimization process 1012 can further comprise saving the new 3D CAD models as new part CAD model files to be included as part of the set of optimized CAD model files 1004.

The file optimization process 1002 can also comprise a light transmission optimization process 1014. The light transmission optimization process 1014 can comprise changing a design feature of a 3D CAD model of at least one part of the lighting product 300 to improve or enhance a light transmission of the lighting product 300. For example, the light transmission optimization process 1014 can comprise changing a wall thickness of a part of the lighting product 300 (e.g., a light shade) configured to house the light emitting component 502. The light transmission optimization process 1014 can also comprise changing a 3D printing material used to print a part of the lighting product 300 configured to house the light emitting component 502. For example, the light transmission optimization process 1014 can comprise changing a material selected by the designer to a different material (e.g., changing from an opaque material 810 to a translucent material 812).

One technical problem previously faced by the applicant is that designers often would submit designs of lighting products that cannot be printed or cannot be printed at scale. Moreover, the process of fixing such designs could be time consuming and labor intensive, especially when undertaken by the designers themselves. One technical solution provided by the applicant is to subject all CAD model files submitted by the designer to the aforementioned verification process where both the assembly CAD model file and the plurality of part CAD model files are checked to ensure they satisfy certain design requirements associated with the type, category, and size of the lighting product desired to be manufactured. Moreover, a set of optimized CAD model files 1004 can then be generated in accordance with the foregoing steps and based in part on the results of the verification process and to further improve the printability or ease an assembly of the lighting product.

A number of embodiments have been described. Nevertheless, it will be understood by one of ordinary skill in the art that various changes and modifications can be made to this disclosure without departing from the spirit and scope of the embodiments. Elements of systems, devices, apparatus, and methods shown with any embodiment are exemplary for the specific embodiment and can be used in combination or otherwise on other embodiments within this disclosure. For example, the steps of any methods depicted in the figures or described in this disclosure do not require the particular order or sequential order shown or described to achieve the desired results. In addition, other steps operations may be provided, or steps or operations may be eliminated or omitted from the described methods or processes to achieve the desired results. Moreover, any components or parts of any apparatus or systems described in this disclosure or depicted in the figures may be removed, eliminated, or omitted to achieve the desired results. In addition, certain components or parts of the systems, devices, or apparatus shown or described herein have been omitted for the sake of succinctness and clarity.

Accordingly, other embodiments are within the scope of the following claims and the specification and/or drawings may be regarded in an illustrative rather than a restrictive sense.

Each of the individual variations or embodiments described and illustrated herein has discrete components and features which may be readily separated from or combined with the features of any of the other variations or embodiments. Modifications may be made to adapt a particular situation, material, composition of matter, process, process act(s) or step(s) to the objective(s), spirit or scope of the present invention.

Methods recited herein may be carried out in any order of the recited events that is logically possible, as well as the recited order of events. Moreover, additional steps or operations may be provided or steps or operations may be eliminated to achieve the desired result.

Furthermore, where a range of values is provided, every intervening value between the upper and lower limit of that range and any other stated or intervening value in that stated range is encompassed within the invention. Also, any optional feature of the inventive variations described may be set forth and claimed independently, or in combination with any one or more of the features described herein. For example, a description of a range from 1 to 5 should be considered to have disclosed subranges such as from 1 to 3, from 1 to 4, from 2 to 4, from 2 to 5, from 3 to 5, etc. as well as individual numbers within that range, for example 1.5, 2.5, etc. and any whole or partial increments therebetween.

All existing subject matter mentioned herein (e.g., publications, patents, patent applications) is incorporated by reference herein in its entirety except insofar as the subject matter may conflict with that of the present invention (in which case what is present herein shall prevail). The referenced items are provided solely for their disclosure prior to the filing date of the present application. Nothing herein is to be construed as an admission that the present invention is not entitled to antedate such material by virtue of prior invention.

Reference to a singular item, includes the possibility that there are plural of the same items present. More specifically, as used herein and in the appended claims, the singular forms "a," "an," "said" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Unless defined otherwise, all technical and scientific terms used herein have the same meaning as commonly understood by one of ordinary skill in the art to which this invention belongs.

In understanding the scope of the present disclosure, the term "comprising" and its derivatives, as used herein, are intended to be open-ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" "element," or "component" when used in the singular can have the dual meaning of a single part or a plurality of parts. As used herein, the following directional terms "forward, rearward, above, downward, vertical, horizontal, below, transverse, laterally, and vertically" as well as any other similar directional terms refer to those positions of a device or piece of equipment or those directions of the device or piece of equipment being translated or moved. Finally, terms of degree such as "substantially", "about" and "approximately" as used herein mean a reasonable amount of deviation (e.g., a deviation of up to ±0.1%, ±1%, ±5%, or ±10%, as such variations are appropriate) from the specified value such that the end result is not significantly or materially changed.

This disclosure is not intended to be limited to the scope of the particular forms set forth, but is intended to cover alternatives, modifications, and equivalents of the variations or embodiments described herein. Further, the scope of the disclosure fully encompasses other variations or embodiments that may become obvious to those skilled in the art in view of this disclosure.

I claim:

1. A method of manufacturing a lighting product, comprising:
    transmitting three-dimensional (3D) computer-aided design (CAD) model files containing 3D CAD models of standardized functional components from a server to a computing device in response to a user input applied at the computing device, wherein the standardized functional components are configured to enable the lighting product to operate functionally;
    receiving, at the server from the computing device, an assembly CAD model file and a plurality of part CAD model files, wherein the assembly CAD model file contains a 3D CAD model of the lighting product in an assembled form, and wherein the part CAD model files contain 3D CAD models of constituent parts of the lighting product;
    verifying whether the 3D CAD models contained within the assembly CAD model file and the plurality of part CAD model files satisfy a plurality of design requirements associated with the lighting product, wherein the design requirements comprise at least whether the 3D CAD models accommodate the standardized functional components and a number of dimension requirements, wherein the design requirements comprise a component relief space requirement, and wherein the component relief space requirement is a requirement that the 3D CAD models comprise a gap or void space separating a light emitting component from an interior wall surface of a light emitting component housing of the lighting product;
    generating a set of optimized CAD model files based on the assembly CAD model file and the plurality of part CAD model files if the 3D CAD models contained within the assembly CAD model file and the plurality of part CAD model files do not meet at least one of the design requirements;
    3D printing parts of the lighting product using one or more 3D printers, wherein the one or more 3D printers are programmed to execute machine-readable instructions converted from the set of optimized CAD model files to 3D print the parts; and
    assembling the 3D-printed parts together with the standardized functional components to yield the lighting product.

2. The method of claim 1, wherein the standardized functional components comprise a light emitting component, a light socket, a light actuator, and at least one weight.

3. The method of claim 1, further comprising:
    receiving, at the server, a category selection concerning a lighting product category from the computing device, wherein the lighting product category comprises at least a table light, a wall light, a floor light, a pendant light, and a portable light;
    receiving, at the server, a size selection concerning a lighting product size from the computing device; and
    setting at least some of the dimension requirements based on the category selection and the size selection, wherein the dimension requirements comprise at least one of a maximum height, a maximum width or depth, and a minimum base footprint width or depth.

4. The method of claim 1, further comprising transmitting, to the computing device, additional 3D CAD model files containing 3D CAD models of component housings configured to house or support the standardized functional components.

5. The method of claim 1, further comprising:
    receiving, from the computing device, a material selection concerning a desired material to print a part of the lighting product; and
    3D printing the part of the lighting product using a 3D printing filament of the desired material.

6. The method of claim 5, wherein the desired material is an opaque 3D printing material or a translucent 3D printing material.

7. The method of claim 6, wherein the part of the lighting product is a light diffuser and wherein the light diffuser is printed using the translucent 3D printing material.

8. The method of claim 5, wherein the 3D printing filament is a plant-based polylactic acid (PLA) filament.

9. The method of claim 1, wherein the machine-readable instructions are G-Code instructions, and wherein the method further comprises changing the G-Code instructions pertaining to at least one of a printhead temperature, a print speed, and an extrusion amount after the G-Code instructions are converted from the set of optimized CAD model files.

10. The method of claim 1, wherein the step of generating the set of optimized CAD model files further comprises at least one of:
    adding an accommodation for a standardized functional component in one of the 3D CAD models;
    changing a design of an overhang in one of the 3D CAD models;
    adding a locating feature to one of the 3D CAD models; and
    changing a mating feature in one of the 3D CAD models into a different mating feature.

11. A system for manufacturing a lighting product, comprising:
    a cloud storage configured to store 3D computer-aided design (CAD) model files containing 3D CAD models of standardized functional components, wherein the standardized functional components are configured to enable the lighting product to operate functionally;
    a server comprising one or more processors, wherein the server is configured to access the cloud storage, and wherein the one or more processors are programmed to execute instructions to:
        transmit, to a computing device, one or more of the 3D CAD model files of the standardized functional components in response to a user input applied at the computing device,
        receive, from the computing device, an assembly CAD model file and a plurality of part CAD model files, wherein the assembly CAD model file contains a 3D CAD model of the lighting product in an assembled form, and wherein the part CAD model files contain 3D CAD models of constituent parts of the lighting product, verify whether the 3D CAD models contained within the assembly CAD model file and the plurality of part CAD model files satisfy a plurality of design requirements associated with the lighting product, wherein the design requirements comprise at least whether the 3D CAD models accommodate the standardized functional components and a number of dimension requirements, wherein the design requirements comprise a component relief space requirement, and wherein the component relief space requirement is a requirement that the 3D CAD models comprise a gap or void space separating a light emitting component from an interior wall surface of a light emitting component housing of the lighting product, and generate a set of optimized CAD model files based on the assembly CAD model file and the plurality of part CAD model files if the 3D CAD models contained within the assembly CAD model file and the plurality of part CAD model files do not meet at least one of the design requirements; and one or more 3D printers configured to 3D print the constituent parts of the lighting product, wherein the one or more 3D printers are programmed to execute machine-readable instructions converted from the set of optimized CAD model files to 3D print the parts.

12. The system of claim 11, wherein the standardized functional components comprise at least a light emitting component, a light socket, a light actuator, and one weight.

13. The system of claim 11, wherein the one or more processors of the server are further programmed to receiving, from the computing device, a material selection concerning a desired material to print a part of the lighting product and wherein the 3D printers are configured to 3D print the part of the lighting product using a 3D printing filament of the desired material.

14. The system of claim 11, wherein the one or more processors of the server are further programmed to generate the set of optimized CAD model files by performing at least one of:

adding an accommodation for a standardized functional component in one of the 3D CAD models;

changing a design of an overhang in one of the 3D CAD models;

adding a locating feature to one of the 3D CAD models; and changing a mating feature in one of the 3D CAD models into a different mating feature.

15. A method of 3D printing parts of a lighting product, comprising:

transmitting three-dimensional (3D) computer-aided design (CAD) model files containing 3D CAD models of standardized functional components from a server to a computing device in response to a user input applied at the computing device, wherein the standardized functional components are configured to enable the lighting product to operate functionally;

receiving, at the server from the computing device, an assembly CAD model file and a plurality of part CAD model files, wherein the assembly CAD model file contains a 3D CAD model of the lighting product in an assembled form, and wherein the part CAD model files contain 3D CAD models of constituent parts of the lighting product;

verifying whether the 3D CAD models contained within the assembly CAD model file and the plurality of part CAD model files satisfy a plurality of design requirements associated with the lighting product, wherein the design requirements comprise at least whether the 3D CAD models accommodate the standardized functional components and a number of dimension requirements, wherein the design requirements comprise a component relief space requirement, and wherein the component relief space requirement is a requirement that the 3D CAD models comprise a gap or void space separating a light emitting component from an interior wall surface of a light emitting component housing of the lighting product;

generating a set of optimized CAD model files based on the assembly CAD model file and the plurality of part CAD model files if the 3D CAD models contained within the assembly CAD model file and the plurality of part CAD model files do not meet at least one of the design requirements; and 3D printing parts of the lighting product using one or more 3D printers, wherein the one or more 3D printers are programmed to execute machine-readable instructions converted from the set of optimized CAD model files to 3D print the parts.

16. The method of claim 15, wherein the step of generating the set of optimized CAD model files further comprises at least one of:

adding an accommodation for a standardized functional component in one of the 3D CAD models;

changing a design of an overhang in one of the 3D CAD models;

adding a locating feature to one of the 3D CAD models; and changing a mating feature in one of the 3D CAD models into a different mating feature.

17. The method of claim 15, wherein the machine-readable instructions are G-Code instructions, and wherein the method further comprises changing the G-Code instructions pertaining to at least one of a printhead temperature, a print speed, and an extrusion amount after the G-Code instructions are converted from the set of optimized CAD model files.

* * * * *